United States Patent
Kickton et al.

(10) Patent No.: US 12,276,519 B1
(45) Date of Patent: Apr. 15, 2025

(54) CREATION OF SUNLIGHT OCCUPANCY GRID MAP FOR ELECTRIC VEHICLES

(71) Applicant: Mercedes-Benz Group AG, Stuttgart (DE)

(72) Inventors: Anne Kickton, Santa Clara, CA (US); Yooseong Kim, Santa Clara, CA (US); Christopher Monaco, Sunnyvale, CA (US); Manuel Schier, Hayward, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/428,021

(22) Filed: Jan. 31, 2024

(51) Int. Cl.
*G01C 21/00* (2006.01)
*G06V 10/60* (2022.01)
*G06V 20/56* (2022.01)

(52) U.S. Cl.
CPC ...... *G01C 21/3811* (2020.08); *G01C 21/3841* (2020.08); *G06V 10/60* (2022.01); *G06V 20/56* (2022.01)

(58) Field of Classification Search
CPC ............ G01C 21/3811; G01C 21/3841; G06V 10/60; G06V 20/56
See application file for complete search history.

(56) References Cited

U.S. PATENT DOCUMENTS

| | | |
|---|---|---|
| 2009/0177458 A1 | 7/2009 | Hochart et al. |
| 2014/0232854 A1* | 8/2014 | Kim .................... G06V 10/763 348/135 |
| 2018/0245944 A1* | 8/2018 | Akselrod .......... G01C 21/3691 |
| 2020/0257019 A1* | 8/2020 | Bing ....................... G01W 1/12 |
| 2020/0393259 A1* | 12/2020 | Gantt, Jr. ................ B60L 53/65 |
| 2022/0065652 A1* | 3/2022 | Herman ............. G01C 21/3685 |
| 2022/0107203 A1* | 4/2022 | Lawrence .......... G01C 21/3691 |
| 2023/0079514 A1 | 3/2023 | Nakagawa |

(Continued)

FOREIGN PATENT DOCUMENTS

| | | |
|---|---|---|
| CN | 112019133 A | 12/2020 |
| EP | 2830030 A1 | 1/2015 |
| WO | WO-2023040712 A1 * | 3/2023 |

OTHER PUBLICATIONS

Machine Translation of WO2023040712A1 (Year: 2023).*

(Continued)

*Primary Examiner* — Sahar Motazedi
(74) *Attorney, Agent, or Firm* — Dority & Manning, P.A.

(57) ABSTRACT

Methods and systems for improving the charging of battery electric vehicles (BEVs) using solar irradiance. For example, a computing system may be configured to obtain sensor data from a plurality of vehicles, where the sensor data is indicative of sensor measurement data acquired by a perception sensor of the respective vehicle, a time the sensor measurement data was acquired, and a pose of the vehicle. The computing system may be configured to, based on the sensor data from the plurality of vehicles, determine a plurality of solar irradiance levels for a plurality of locations within a geographic area. The computing system may be configured to generate a map layer, the map layer being indicative of a respective solar irradiance level for each of the plurality of locations. The computing system may be configured to output the map layer for integration into map data associated with the geographic area.

18 Claims, 12 Drawing Sheets

(56) References Cited

U.S. PATENT DOCUMENTS

| | | | |
|---|---|---|---|
| 2023/0173937 A1* | 6/2023 | Dudar | B60L 58/12 |
| 2023/0306801 A1* | 9/2023 | Beaurepaire | G01C 21/3469 |
| 2023/0408266 A1* | 12/2023 | Ali | G01C 21/3822 |
| 2024/0190206 A1* | 6/2024 | Turcot | B60H 1/00742 |
| 2024/0193820 A1* | 6/2024 | Suto | G06T 11/00 |

OTHER PUBLICATIONS

Nonnenmacher et al., "Verification of the SUNY direct normal irradiance model with ground measurements", Solar Energy 99, 2014, pp. 246-258.

Wikipedia, "Solar irradiance", https://en.wikipedia.org/wiki/Solar_irradiance, retrieved on Jan. 31, 2024, 20 pages.

* cited by examiner

CREATION OF SUNLIGHT OCCUPANCY GRID MAP FOR ELECTRIC VEHICLES

FIELD

The present disclosure relates generally to improving charging of battery electric vehicles (BEVs). More particularly, the present disclosure relates to the generative creation of solar irradiance maps for BEVs, furthering the usage of solar energy by vehicles and reducing greenhouse gas emissions.

BACKGROUND

Battery electric vehicles (BEVs) use one or more electric motors powered by electricity stored in a battery pack for propulsion. BEVs are capable of being charged from extravehicular sources. Example extravehicular sources can be accessed by plugging to an external power source or capturing solar power.

SUMMARY

Aspects and advantages of implementations of the present disclosure will be set forth in part in the following description, or may be learned from the description, or may be learned through practice of the implementations.

One example aspect of the present disclosure is directed to a computing system of a vehicle. The computing system includes a control circuit configured to obtain sensor data from a plurality of vehicles, the sensor data including respective sensor data acquired by a respective vehicle of the plurality of vehicles, wherein the respective sensor data is indicative of: (i) sensor measurement data acquired by a perception sensor of the respective vehicle, (ii) a time the sensor measurement data was acquired, and (iii) a pose of the vehicle at the time the sensor measurement data was acquired. The control circuit is configured to, based on the sensor data from the plurality of vehicles, determine a plurality of solar irradiance levels for a plurality of locations within a geographic area. The control circuit is configured to generate a map layer based on the plurality of solar irradiance levels, the map layer being indicative of a respective solar irradiance level for each of the plurality of locations within the geographic area. The control circuit is configured to output the map layer for integration into map data associated with the geographic area.

In an embodiment, the plurality of vehicles includes at least one of: one or more electric vehicles or one or more hybrid electric vehicles.

In an embodiment, the time the sensor measurement data was acquired is indicative of least at one of: a date on which the sensor measurement data was acquired or a time of day the sensor measurement data was acquired.

In an embodiment, the sensor measurement data acquired by the perception sensor includes at least one of: image data of an environment of the respective vehicle, wherein the image data was acquired using a camera of the respective vehicle; LIDAR data of the environment of the respective vehicle, wherein the LIDAR data was acquired using a LIDAR sensor of the respective vehicle; RADAR data of the environment of the respective vehicle, wherein the RADAR data was acquired using a RADAR sensor of the respective vehicle; or ultrasonic data of the environment of the respective vehicle, wherein the ultrasonic data was acquired using an ultrasonic sensor of the respective vehicle.

In an embodiment, the camera of the respective vehicle includes an optical camera or an infrared camera.

In an embodiment, the control circuit is configured to obtain, from a remote computing system, published solar irradiance data associated with the geographic area, wherein the published solar irradiance data is indicative of one or more average solar irradiance levels for one or more portions of the geographic area. In an embodiment, determining the plurality of solar irradiance levels for the plurality of locations within the geographic area includes determining at least one solar irradiance level for at least one location based on the published solar irradiance data.

In an embodiment, the control circuit is configured to obtain weather data associated with the geographic area. In an embodiment, determining the plurality of solar irradiance levels includes determining the plurality of solar irradiance levels for the plurality of locations based on the weather data.

In an embodiment, generating the map layer includes generating a grid data structure based on the sensor data, the grid data structure indicating a respective solar irradiance level for a respective location of the plurality of locations via one or more cells of the grid data structure.

In an embodiment, the respective solar irradiance level for a respective location is indicative of a power per unit area.

In an embodiment, the map data includes a parking space layer, the parking space layer being configured to combine with the map layer to indicate a solar irradiance level associated with a parking space within the geographic area.

In an embodiment, at least a portion of the respective sensor data is processed onboard the respective vehicle and provided to the computing system by the respective vehicle.

In an embodiment, outputting the map layer includes at least one of: outputting the map layer for use within the map data in a human-machine interface or outputting the map layer for storage in a memory with the map data.

One example aspect of the present disclosure is directed to a computer-implemented method. The computer-implemented method includes obtaining sensor data from a plurality of vehicles, the sensor data including respective sensor data acquired by a respective vehicle of the plurality of vehicles, wherein the respective sensor data is indicative of: (i) sensor measurement data acquired by a perception sensor of the respective vehicle, (ii) a time the sensor measurement data was acquired, and (iii) a pose of the vehicle at the time the sensor measurement data was acquired. The method includes, based on the sensor data from the plurality of vehicles, determining a plurality of solar irradiance levels for a plurality of locations within a geographic area. The method includes, generating a map layer based on the plurality of solar irradiance levels, the map layer being indicative of a respective solar irradiance level for each of the plurality of locations within the geographic area. The method includes outputting the map layer for integration into map data associated with the geographic area.

In an embodiment, the time the sensor measurement data was acquired is indicative of least at one of: a date on which the sensor measurement data was acquired or a time of day the sensor measurement data was acquired.

In an embodiment, the sensor measurement data acquired by the perception sensor includes at least one of: image data of an environment of the respective vehicle, wherein the image data was acquired using a camera of the respective vehicle; LIDAR data of the environment of the respective vehicle, wherein the LIDAR data was acquired using a LIDAR sensor of the respective vehicle; RADAR data of the environment of the respective vehicle, wherein the RADAR data was acquired using a RADAR sensor of the respective vehicle; or ultrasonic data of the environment of the respective vehicle, wherein the ultrasonic data was acquired using an ultrasonic sensor of the respective vehicle.

In an embodiment, the computer-implemented method includes obtaining, from a remote computing system, published solar irradiance data associated with the geographic area, wherein the published solar irradiance data is indicative of one or more average solar irradiance levels for one or more portions of the geographic area. In an embodiment, the computer-implemented method determining the plurality of solar irradiance levels for the plurality of locations within the geographic area includes determining at least one solar irradiance level for at least one location based on the published solar irradiance data.

In an embodiment, generating the map layer includes generating a grid data structure based on the sensor data, the grid data structure indicating a respective solar irradiance level for a respective location of the plurality of locations via one or more cells of the grid data structure.

In an embodiment, outputting the map layer includes outputting the map layer for use within the map data in a vehicle human-machine interface.

In an embodiment, outputting the map layer includes outputting the map layer for storage in a memory with the map data.

One example aspect of the present disclosure is directed to one or more non-transitory computer-readable media that store instructions that are executable by a control circuit to: obtain sensor data from a plurality of vehicles, the sensor data including respective sensor data acquired by a respective vehicle of the plurality of vehicles, wherein the respective sensor data is indicative of: (i) sensor measurement data acquired by a perception sensor of the respective vehicle, (ii) a time the sensor measurement data was acquired, and (iii) a pose of the vehicle at the time the sensor measurement data was acquired; based on the sensor data from the plurality of vehicles, determine a plurality of solar irradiance levels for a plurality of locations within a geographic area; generate a map layer based on the plurality of solar irradiance levels, the map layer being indicative of a respective solar irradiance level for each of the plurality of locations within the geographic area; and output the map layer for integration into map data associated with the geographic area.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

Figure 1:
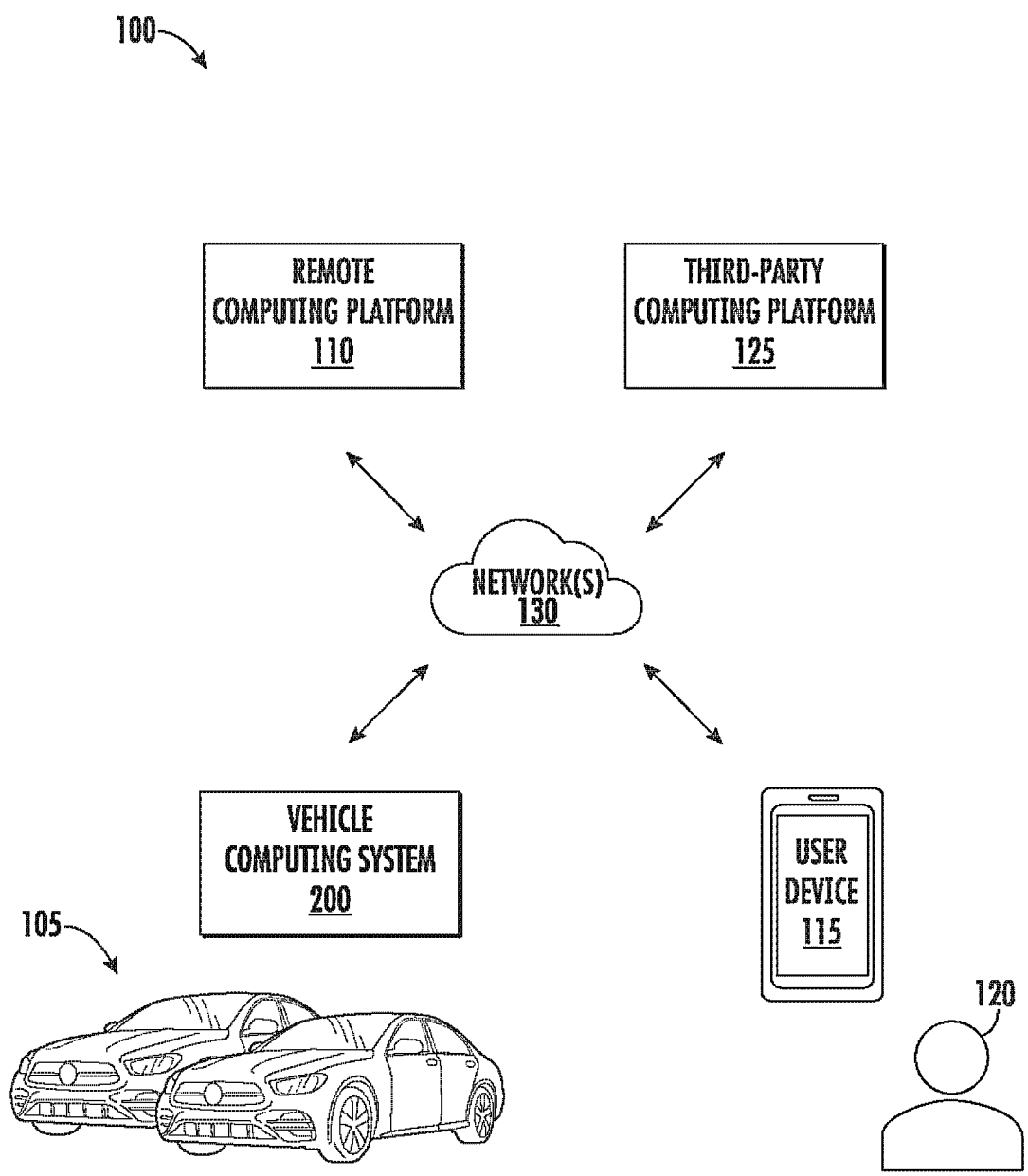
FIG. 1 illustrates an example computing ecosystem according to an embodiment hereof.

An aspect of the present disclosure relates to systems and methods for improving the charging of battery electric vehicles (BEVs) using sunlight. For instance, BEVs can utilize one or more solar panels to capture sunlight as an alternative source of energy independent from insufficient electric charging infrastructure that is often too distant, slow, unreliable, or unavailable for drivers. While the charging potential for solar panels may appear small, it may be sufficient for drivers who have short daily commutes or do not drive for days at a time. However, the sunlight charging potential of a particular parking spot is often unpredictable and can vary drastically based on a plurality of factors such as the geolocation of the parking spot, the time of day, time of year, weather conditions, local topology, etc. Furthermore, the sunlight charging potential can vary based on the duration of time the BEV will be parked in the particular parking spot.

Current technology attempts to solve this problem by analyzing satellite imagery of the Earth's surface to determine solar irradiance levels. However, satellite imagery does not have the requisite resolution to accurately quantify solar irradiance levels at a precise locations such as specific parking spots within a parking lot. Furthermore, satellite imagery requires substantial processing time and is inadequate for quantifying solar irradiance levels in short-term timeframes. Other attempts to solve this problem include utilizing sensors positioned within a geographic area to determine solar irradiance levels. However, this approach may only cover small areas as solar sensors are not prevalent or equally distributed across every geographic area. Compared to previous attempts, the technology of the present disclosure relies on perception measurements from the sensors of vehicles operating within the geographic area over time and aggregates the fleet data to generate a solar irradiance map that has the spatial and temporal resolution necessary to provide practical solar parking information for short-term timeframes.

For instance, to address this problem, the technology of the present disclosure determines the solar irradiance level for different parking areas in a geographic area. Solar irradiance can be a time-variant (e.g., may differ at the same location based on the date or time of day) measurement that quantifies units of power per unit area (e.g., SI units). The solar irradiance level can be used to update map data descriptive of an estimated solar charging potential of the different parking areas.

For instance, an irradiance computing system can obtain sensor data from a plurality of vehicles. Sensor data can include measurements from the respective vehicle's onboard perception sensors. In some embodiments the irradiance computing system can obtain the respective vehicle's global pose (e.g., position, orientation, etc.), weather information, or access other known databases or models associated with the Earth's atmosphere. Based on datetime stamps indicating the date and time the sensor data was captured by the respective vehicles, the irradiance computing system can determine an irradiance level for a particular location (e.g., unit areas).

According to examples embodiments of the present disclosure, the irradiance computing system can generate, based on the solar irradiance levels, a map layer indicating the solar irradiance level for each of the plurality of locations. For instance, the map layer can be integrated with map data where corresponding locations on a map are supplemented with irradiance levels indicating estimated solar charging potential for the respective locations. In an embodiment, the estimated solar charging potential may be quantified as possible additional miles for the BEV.

Systems and methods according to example aspects of the present disclosure can provide a number of technical effects and benefits. For instance, systems and methods according to example aspects of the present disclosure can help improve the efficiency of the computational resource energy usage and onboard computing resources of the BEV. For instance, the BEV's onboarding vehicle computing system may leverage sensor data captured by a fleet of vehicles over time in the same geographic area rather than expend its own computing resources to capture and compile sensor data needed to determine an irradiance level. Accordingly, the vehicle computing system may avoid wasting its own computing resources to locate a parking space which maximizes solar charging potential.

Furthermore, by iteratively updating the map layers based on ground fleet data from a plurality of vehicles in the geographic area, the irradiance computing system can continuously update the map data. In this way, the vehicle computing system can more efficiently utilize its computing resources, as well as reduce energy otherwise wasted traversing a parking area in search of the most optimal solar charging location.

Ultimately, the technology of the present disclosure includes systems and processes that mitigate climate change. For example, by improving the ability for a BEV to leverage solar energy, the amount of traffic and congestion at charging stations can be reduced. This allows the BEV to utilize a clean energy source, without relying on power plants of various types to generate energy for charging stations. Moreover, improvements in the efficiency of energy storage systems of BEVs can increase the adoption of such technology, reducing overall greenhouse gas emissions.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc.

In some implementations, the vehicle 105 may be a fully or semi-autonomous vehicle. In other implementations, the vehicle 105 may be a Battery electric vehicle (BEV), Plug-in Hybrid Electric Vehicle (PHEV), Hybrid Electric Vehicle (HEV), Fuel cell electric vehicle (FCEV), or any other vehicle capable of using electricity as a means for operation of the vehicle. For instance, the vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. By way of example, the vehicle 105 may be a fully electric vehicle (BEV, EV, etc.) that is capable of operating an electric powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 that is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
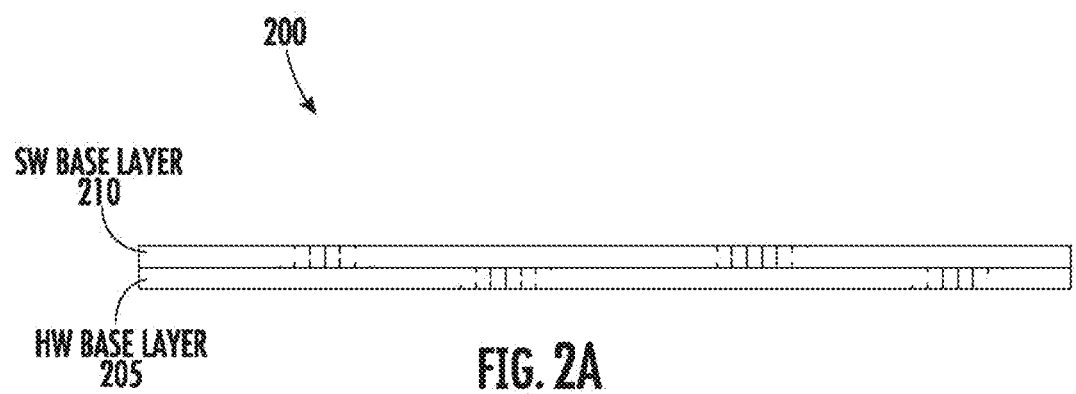
FIGS. 2A-D illustrate diagrams of an example computing architecture for an onboard computing system of a vehicle according to an embodiment hereof.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
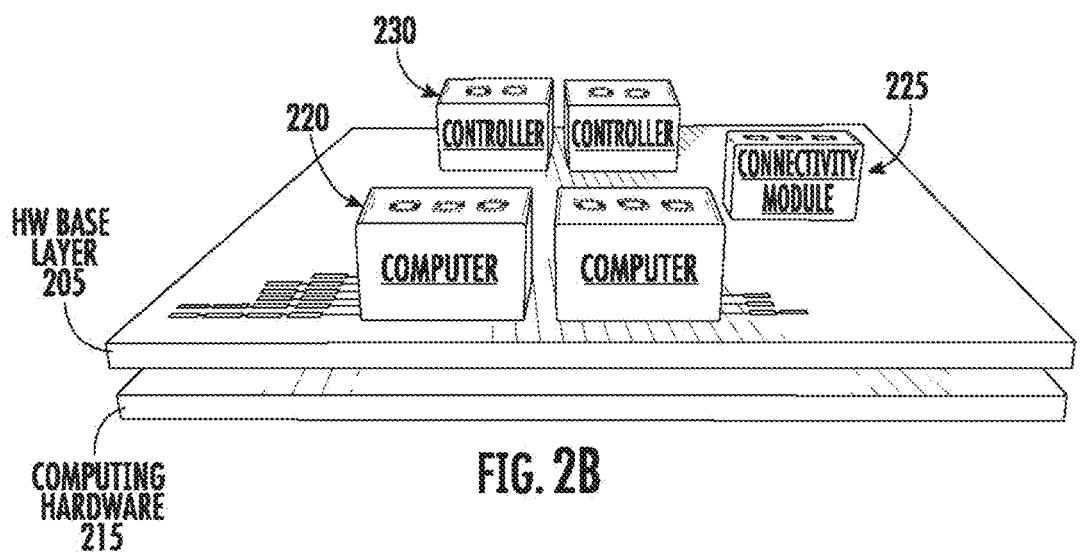

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 225. The vehicle control units 225 may be configured for controlling various functions of the vehicle 105. This may include, for example, a central exterior and interior controller (CEIC), a charging controller, or other controllers as further described herein.

Figure 2C:
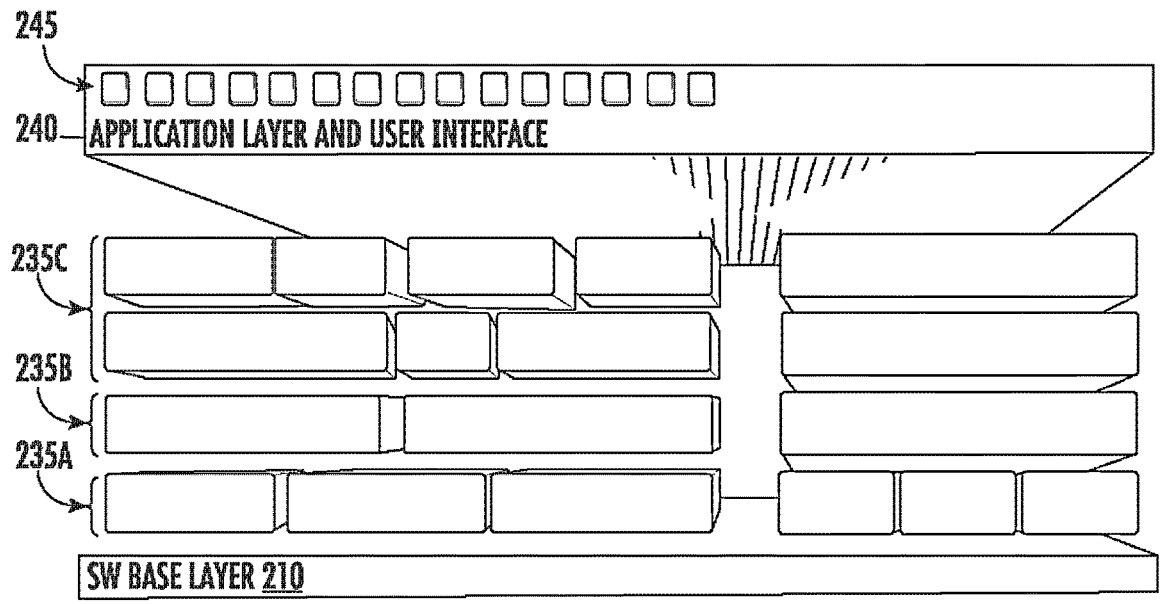

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
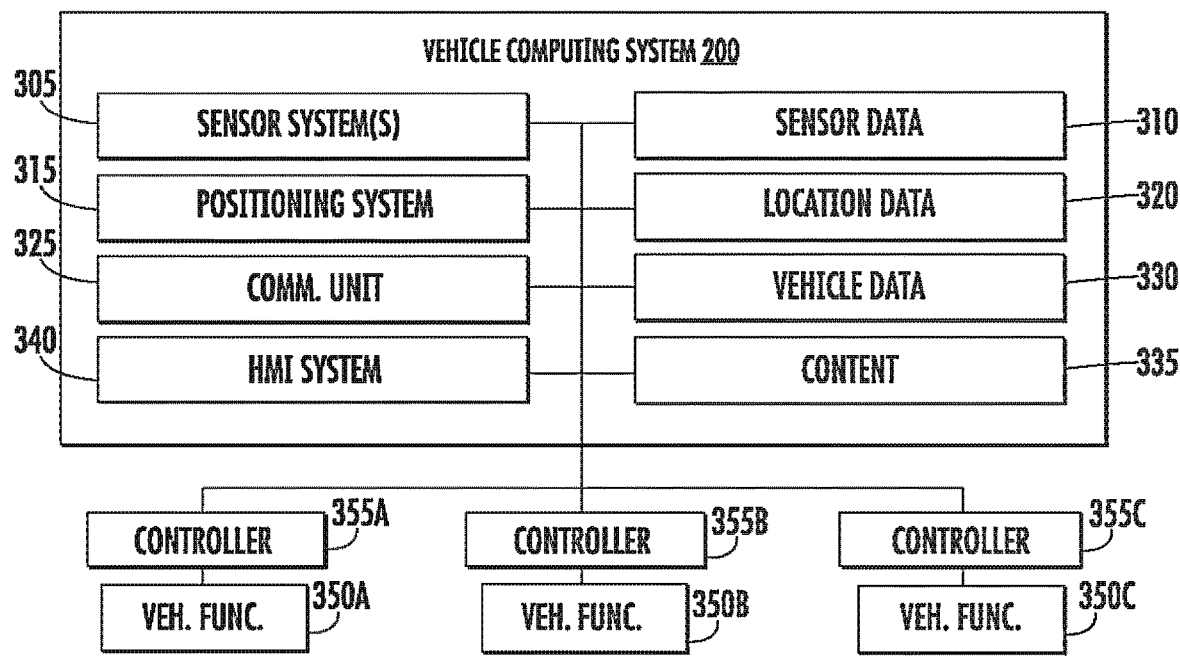

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data.

The sensors may be perception sensors such as cameras (e.g., visible spectrum cameras, infrared cameras), Light Detection and Ranging (LIDAR) systems, Radio Detection and Ranging (RADAR) systems, ultrasonic sensors, etc. By way of example, perception sensors can include any type of imaging sensor. In an embodiment, sensors can include other types of sensors such as motion sensors, audio sensors (e.g., microphones), weight sensors (e.g., for a vehicle a seat), temperature sensors, humidity sensors, etc. The vehicle 105 may include other sensors configured to acquire data associated with the vehicle 105. For example, the vehicle 105 may include inertial measurement units or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to transmit sensor data 310 to the computing platform 110. This may include, for example, an LIDAR data, RADAR data, images, etc. captured by the sensor system 305 of the vehicle computing system 200. Additionally, or alternatively, the vehicle computing system 200 may utilize the communications unit 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
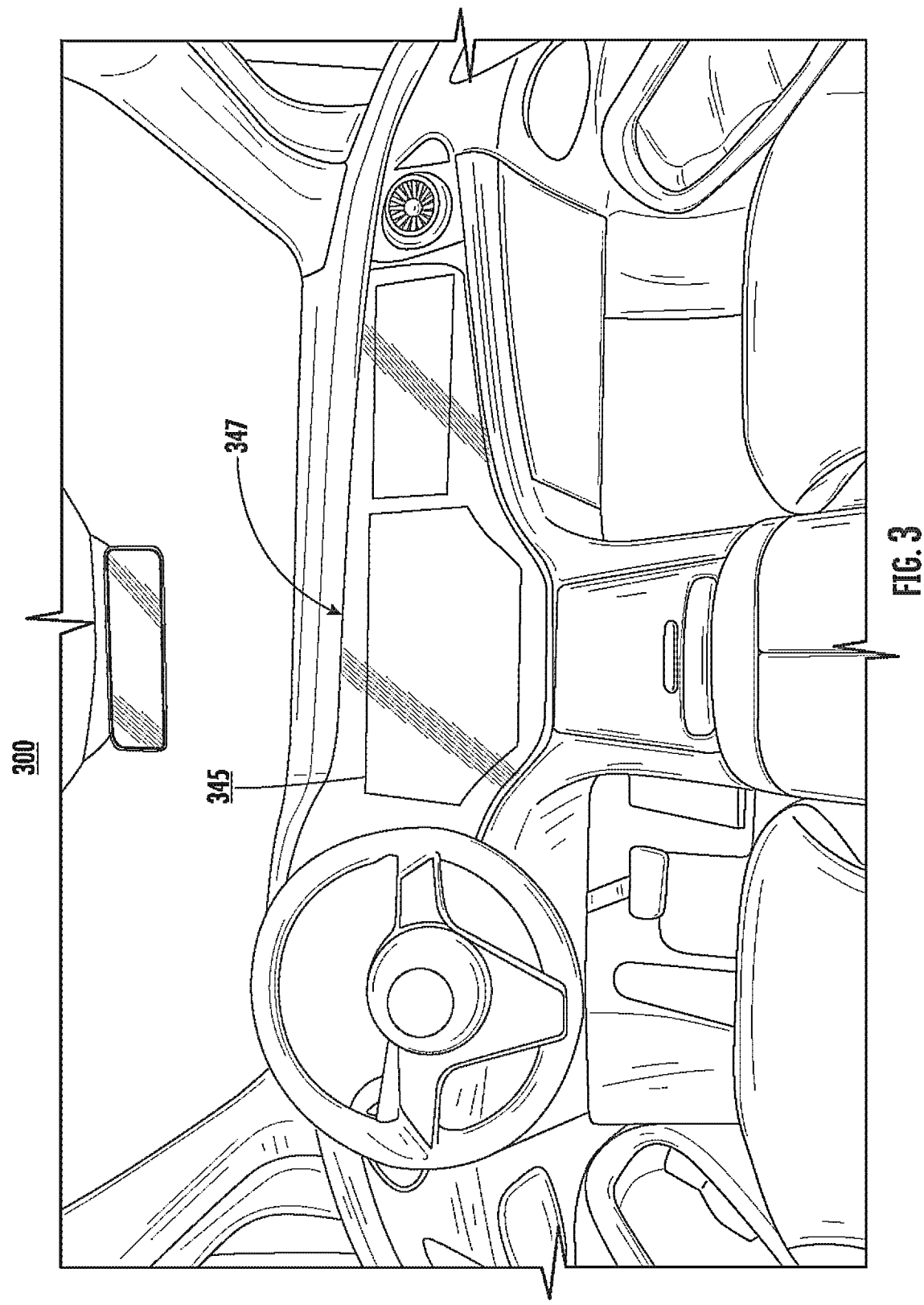
FIG. 3 illustrates an example vehicle interior with an example display according to an embodiment hereof.

FIG. 3 illustrates an example vehicle interior 300 with a display device 345. The display device 345 may be a component of the vehicle's head unit or infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, and/or other suitable display components.

The display device 345 may display a variety of content to the user 120 including information about the vehicle 105, prompts for user input, etc. The display device may include a touchscreen through which the user 120 may provide user input to a user interface. For example, the display device 345 may include user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data 335. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120. For instance, in some embodiments, the display device 345 may provide the user 120 with controls to gather user input including input indicating the user 120 intends to locate parking for the vehicle 105.

The vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI element) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data 335 and transmitted to the computing platform 110.

Figure 4:
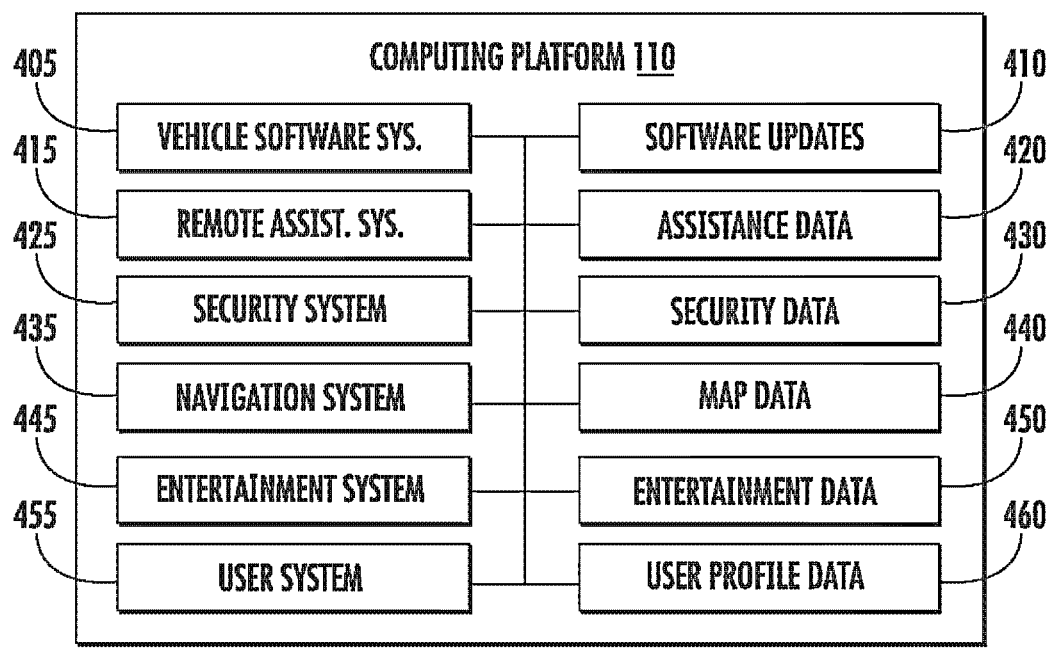
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110.

In an example, the computing platform 110 may include a vehicle software system 405 that is configured to provide the vehicle 105 with one or more software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle computing system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air software updates via a network 130.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 1110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via a user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 120, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. The user profile data 460 may be updated based on information periodically provided by the vehicle 105. In some implementations, the user profile data 460 may be provided to the user device 120.

Figure 5:
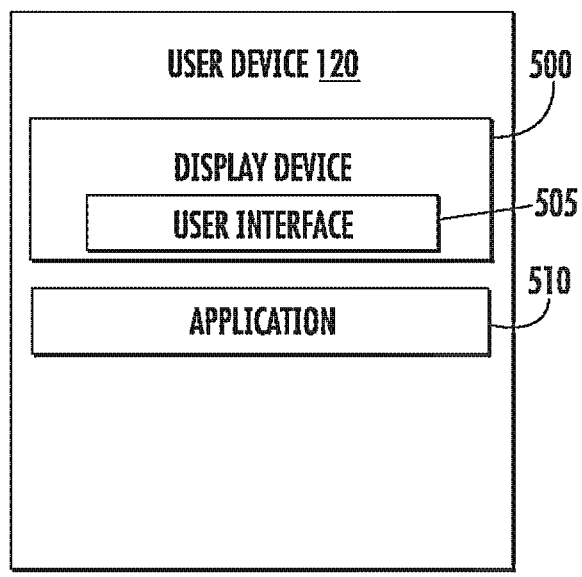
FIG. 5 illustrates a diagram of an example user device according to an embodiment hereof.

FIG. 5 illustrates a diagram of example components of user device 120 according to an embodiment hereof. The user device 120 may include a display device 500 configured to render content via a user interface 505 for presentation to a user 120. The display device 500 may include a display screen, CRT, LCD, plasma screen, touch screen, TV, projector, tablet, or other suitable display components. The user device 120 may include a software application 510 that is downloaded and runs on the user device 120. In some implementations, the software application 510 may be associated with the vehicle 105 or an entity associated with the vehicle 105 (e.g., manufacturer, retailer, maintenance provider). In an example, the software application 510 may enable the user device 120 to communicate with the computing platform 110 and the services thereof.

The technology of the present disclosure allows the vehicle computing system 200 to extend its computing capabilities by utilizing sensor data generated by a plurality of vehicles within a geographic region to locate parking spaces which maximize solar charging potential. In particular, the vehicle computing system 200 can utilize or otherwise access an irradiance computing system, to determine irradiance levels for a plurality of locations and generate map layers to update map data content for display through, for example, user device 120, display device 345, or other suitable display device.

Figure 6:
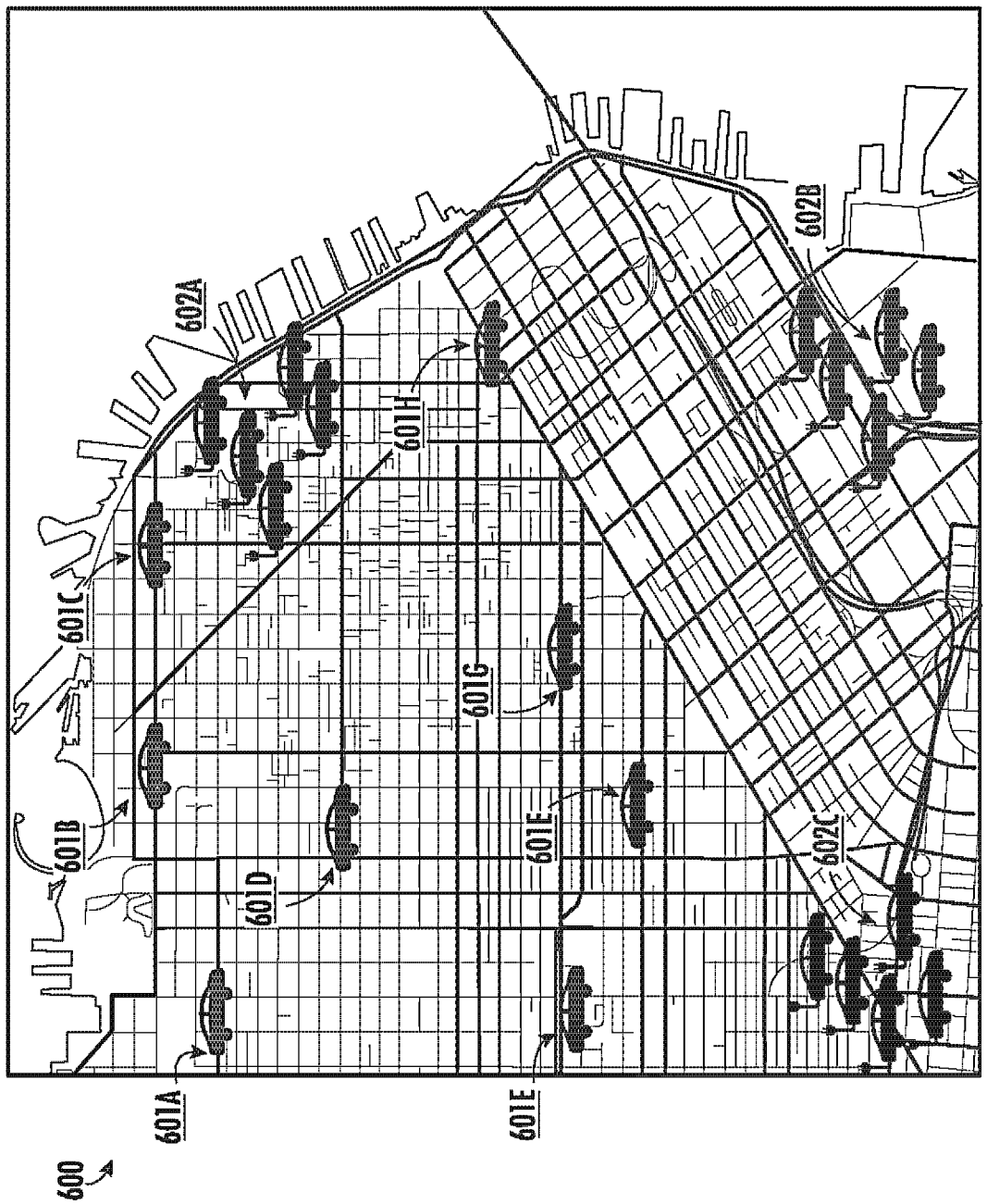
FIG. 6 illustrates an example fleet of electric vehicles within a geographic area according to an embodiment hereof.

FIG. 6 illustrates an example fleet of vehicles within a geographic area 600 according to an embodiment hereof. The example geographic area 600 can be any type of area suitable for vehicular transportation such as a metropolitan, urban, or rural area. For instance, the geographic area 600 can support a plurality or fleet of vehicles operating concurrently and at various times. The plurality of vehicles can be electric motor vehicles, combustion engine vehicles, or any type of vehicle which includes sensors that capture the external environment.

Respective vehicles of the plurality of vehicles can be in a state of motion within the geographic area 600. For instance, vehicles in motion 601A-G can include respective vehicles of the plurality of vehicles that are traveling along a route within the geographic area 600. The vehicles in motion 601A-G can capture sensor data 310 through one or more sensors as they traverse the geographic area 600. In some embodiments, the vehicles in motion 601A-G can transmit sensor data 310 captured while traversing the geographic area 600 to the remote computing platform 110. In some embodiments, the vehicles in motion 601A-G can transmit sensor data 310 once a destination is reached.

For example, respective vehicles of the plurality of vehicles can be in a parked state within the geographic area 600. For instance, parked vehicles 602A-C can include vehicles parked at charging infrastructure or parked in another location. In some embodiments, the parked vehicles 602A-C can be parked in a covered parking area (e.g., garage, carport, etc.) or in an uncovered parking area. For instance, the parked vehicles 602A-C can be parked in locations where they are exposed to solar charging energy.

The parked vehicles 602A-C can capture sensor data 310 through one or more sensors. For instance, the parked vehicles 602A-C may utilize small amounts of energy to passively capture sensor data 310 at various times while parked at a parking location. The sensor data 310 can describe the surrounding environment of the parked vehicles 302A-C.

In some embodiments, the vehicles in motion 601A-G and parked vehicles 302A-C can transmit via their respective vehicle computing systems 200, sensor data 310 to the remote computing platform 110. For instance, the remote computing platform 110 can obtain sensor data 310 from a particular vehicle or fleet sensor data from the plurality of vehicles in the geographic area 600 and utilize an irradiance computing system to determine irradiance levels for a plurality of areas within the geographic area 600. An example of the remote computing platform 110 obtaining sensor data 310 and fleet sensor data captured by a plurality of vehicles to determine irradiance levels is further described with reference to FIG. 7.

Figure 7:
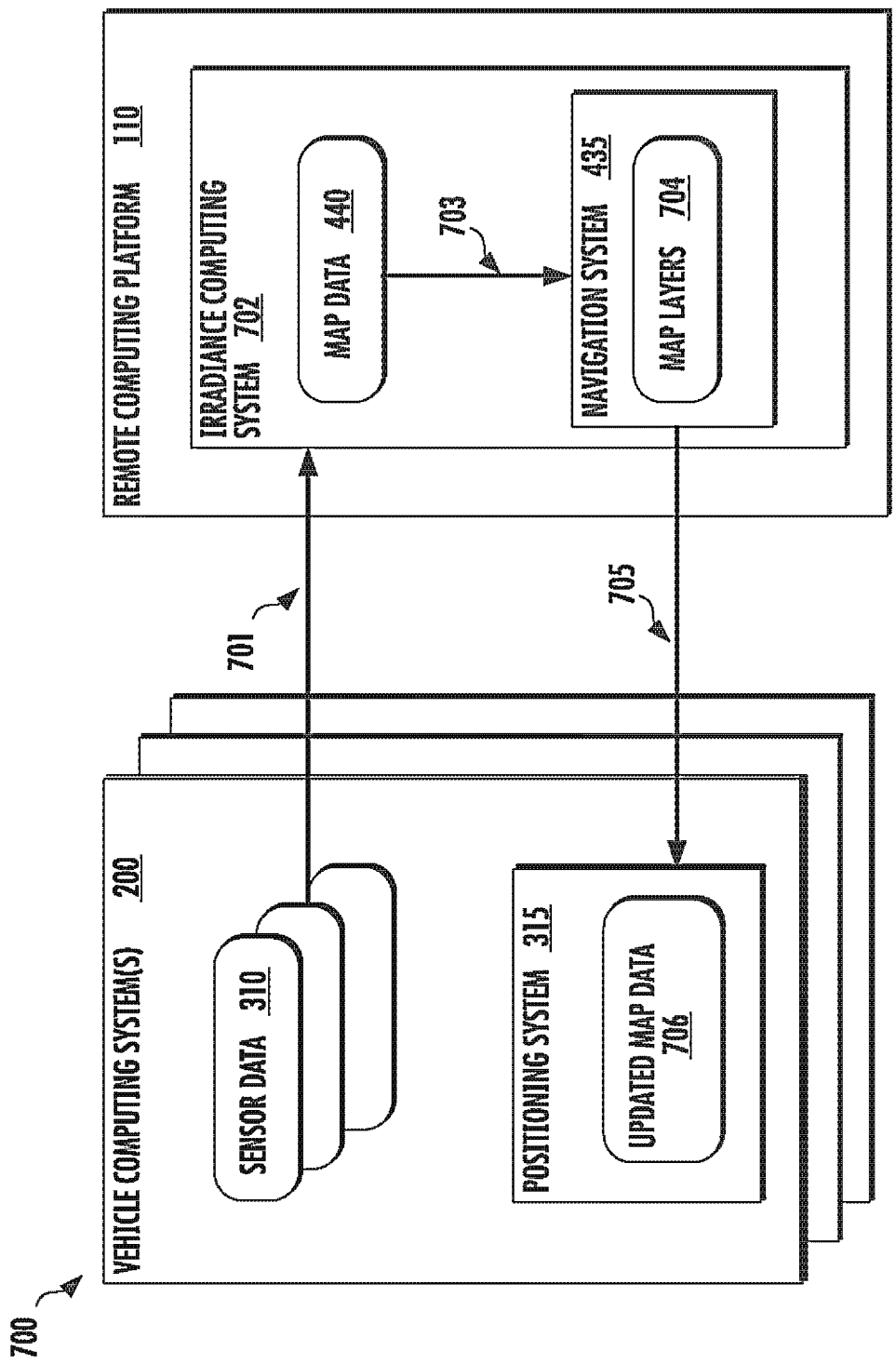
FIG. 7 illustrates a block diagram of an example dataflow pipeline according to an embodiment hereof.

FIG. 7 illustrates a block diagram of an example dataflow pipeline according to an embodiment hereof. The following description of dataflow in data pipeline 700 is described with an example implementation in which an irradiance computing system 702 running on one or more servers of the remote computing platform 110 obtains fleet sensor data 701 from a plurality of vehicle computing systems 200 and, based on the fleet sensor data 701, determines solar irradiance levels 703 for locations associated with the sensor data 310. The solar irradiance levels 703 can be used to generate one or more map layers 704 indicating the locations (e.g., unit areas) of corresponding solar irradiance levels 703 within a map. While examples herein describe the irradiance computing system 702 as a subsystem of the remote computing platform 110, the irradiance computing system 702 can be included within any system (e.g., vehicle computing systems 200, third-party computing platform, user device 115, etc.).

The vehicle computing systems 200 can be associated with a plurality of vehicles (e.g., vehicles in motion 601A-G, parked vehicles 602A-C, etc.) operating in a geographic area 600. For instance, the fleet of vehicles can include ground based vehicles, aerial vehicles, water vehicles, or any vehicle capable of capturing sensor data 310.

The sensor data 310 captured by the respective vehicle computing systems 200 of the fleet of vehicles can include various types of data. For instance, the sensor data 310 can vary from raw (e.g., unprocessed) data to heavily pre-processed data. By way of example, heavily pre-processed measurement may include a video stream that has semantically classified its pixels into "sunlit region" and "non-sunlit region." Another example may include a median image luminance observed from surrounding ground surfaces of a vehicle within the fleet of vehicles.

The sensor data 310 can include various metadata. For instance, the sensor data 310 can include a timestamp indicate when the data was captured as well as a location identifier (e.g., lat./long. coordinates, address, etc.) indicator where the sensor data 310 was captured. The metadata can include other information such as the type of vehicle, dimensions of vehicle (e.g., height), sensor position on vehicle, sensor modality, etc.

Processing sensor data 310 may be distributed between the vehicle computing systems 200 and the irradiance computing system 110. For instance, the vehicle computing system 310 may process sensor data 310 on-board the vehicle. In some embodiments, the vehicle computing systems 200 may compress sensor data 310 or aggregate sensor data 310. Sensor data 310 may be aggregated based on datetime stamps, vehicle pose, modality, or any other parameters. Once processed on-board the vehicle, the vehicle computing systems 200 may transmit the sensor data 310 as fleet sensor data 701 (e.g., aggregated sensor data) for further processing.

For instance, the vehicle computing systems 200 may transmit over one or more networks fleet sensor data 701 to the irradiance computing system 702. Fleet sensor data 701 can include aggregated sensor data 310 captured by one or more vehicles (e.g., vehicle computing systems 200) of the fleet of vehicles. For instance, fleet sensor data 701 can include sensor data 310 aggregated from a plurality of vehicles within a threshold proximity (e.g., unit area) within a geographic area. Fleet sensor data 701 can include sensor data 310 captured by one or more vehicles within a unit area concurrently or over a period of time.

By way of example, four vehicles of the fleet of vehicles may sequentially park within a single parking space over the course of a day. The four vehicles may respectively capture sensor data 310 including measurements from the vehicle's perception sensors during the time the respective vehicle was parked within the parking space. For instance, the sensor data 310 from the four vehicles may indicate the respective vehicle's global pose (e.g., position, orientation, etc.) and timestamps (e.g., day, time, etc.). The sensor data 310 may be unprocessed or processed data. In an embodiment, the irradiance computing system 702 may request fleet sensor data 310 from the four vehicles when a threshold parameter has been satisfied. For instance, the irradiance computing system 702 may access fleet sensor data 701 after a threshold time (e.g., 4 hours, 8 hours, 24 hours, etc.). In another embodiment, the irradiance computing system 702 may access fleet sensor data 701 once a threshold number of vehicles have captured sensor data 310 for a respective unit area. In other examples, the irradiance computing system 702 can access fleet sensor data 702 dynamically or based on any predetermined parameters.

The fleet sensor data 701 can be aggregated based on metadata. For instance, the fleet sensor data 701 can be aggregated based on the modality (e.g., images, LIDAR, RADAR, etc.) the datetime stamp (e.g., data captured at noon each day), the type of vehicle that captured the data (e.g., Van, car, truck, aerial vehicle, etc.). The fleet sensor data 701 can be aggregated to improve processing efficiencies of the irradiance computing system 702 as well as increase the accuracy of determined irradiance levels. While examples herein describe fleet sensor data 701 as aggregated data across a plurality of vehicles, the irradiance computing system 702 may access sensor data 310 from an individual vehicle of the fleet of vehicles.

The irradiance computing system 702 can include software running on one or more servers of the remote computing system 110. The irradiance computing system 702 can be configured to obtain fleet sensor data 701 and process the fleet sensor data 310 to determine a depicted irradiance level 703 per unit area at a specified time. For instance, the irradiance computing system 702 can determine a solar irradiance level 703 per unit area depicted in sensor data 310 based on a datetime stamp indicating the day and time the sensor data 310 was captured. In an embodiment, the irradiance computing system 702 can predict a future irradiance level 703 per unit area based on analyzing sensor data 310 for respective unit areas over a period of time.

Example irradiance levels 703 may be considered very high (e.g., higher than 4 kWh/m$^2$, etc.), high (e.g., between 3-4 kWh/m$^2$, etc.), moderate (e.g., 2.6-3 kWh/m$^2$), or low (e.g., less than 2.6 kWh/m$^2$). While examples herein describe irradiance levels 703 on a scale of very high to low, irradiance levels 703 may include other indicators and be measured using different units (e.g., W/m$^2$, etc.)

The irradiance computing system 702 may include one or more machine-learned irradiance detection models configured to utilize the fleet sensor data 701 to generate output indicative of an irradiance level 703. The irradiance level 703 can indicate actual solar irradiance depicted with the sensor data 310 or predicted solar irradiance at a future time.

In an embodiment, the irradiance detection model may be an unsupervised or supervised learning model configured to identify and measure solar irradiance within a unit area. In some examples, the irradiance detection model may include one or more machine-learned models. For example, the irradiance detection model may include a machine-learned model trained to detect solar irradiance on a surface. In some examples, the irradiance detection model may include a machine-learned model trained to process weather and environmental data. In some examples, the irradiance detection model may include a machine-learned model trained to predict future irradiance levels per unit area. In other examples, the irradiance detection model may include a machine-learned model trained to distinguish sunlight from artificial light on a surface by executing segmentation techniques.

The irradiance detection model may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The irradiance detection model may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using labeled training data. As further described herein, the training data may include labelled image frames that have labels indicating solar irradiance on a surface. In some examples, the training data may include simulated training data (e.g., training data obtained from simulated scenarios, inputs, configurations, various parking areas, surfaces, etc.).

Additionally, or alternatively, the model trainer(s) may perform unsupervised training techniques using unlabeled training data. By way of example, the model trainer(s) may train one or more components of a machine-learned model to perform solar irradiance detection through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

The irradiance computing system 702 can utilize the irradiance detection model to analyze fleet sensor data 701. For instance, the irradiance detection model may be trained to detect solar irradiance on a surface such as other vehicles, ground surfaces, buildings, etc., by performing segmentation techniques. Segmentation techniques may include analyzing the fleet sensor data 701 including one or more image frames and projecting a bounding shape on the image frames.

The bounding shape may be any shape (e.g., polygon) that includes one or more objects or surfaces. For instance, the bounding shape may include a unit area of any size (e.g., square meter, etc.). By way of example, a bounding shape may include a shape that matches the outermost boundaries and contours of those boundaries for an unoccupied parking space. One of ordinary skill in the art will understand that other shapes may be used such as squares, circles, rectangles, etc. In some implementations, the bounding shape may be generated on a per pixel level. The space characteristics may include the x, y, z coordinates of the bounding shape center, the length, width, and height of the bounding shape, etc.

The irradiance detection model may generate data (e.g., labels) that correspond to the characteristics of the bounding shape. Labels may indicate the light reflections (e.g., shading analysis), type of surface (e.g., parking space, vehicle, etc.), the size of the bounding shape, the orientation, etc.

The irradiance detection model may execute segmentation techniques to distinguish "sunlit regions" and "non-sunlit regions". An example of sunlight regions and non-sunlit regions is further described with reference to FIG. 9. The fleet sensor data 701 may include an image frame depicting both sunlit regions and non-sunlit regions. The irradiance detection model may project a bounding shape that encapsulates the sunlit regions and segment the image frame based on the non-sunlit regions. The irradiance detection model may distinguish between the sunlit and non-sunlit regions and generate labels indicating the sunlit regions as solar irradiance.

The irradiance detection model may determine solar irradiance levels by measuring the intensity of detected solar irradiance on a surface. For instance, the irradiance detection model may perform a shading analysis. A shading analysis can include site surveys, sun path diagrams, solar access and exposure calculations, shade maps, 3D modeling, and simulations. For example, the irradiance detection model may access weather data (e.g., cloud coverage, etc.) and other databases or models analyzing Earth's atmosphere for a specific time and/or geocoordinate. The irradiance detection model may determine, based on the fleet sensor data 701 the solar irradiance for a particular unit area and output a solar irradiance level 703 indicating a measurement of the power per unit area (e.g., surface power density) received from the Sun in the form of electromagnetic radiation.

The irradiance level 703 can be used to generate a map layer 704. For instance, the irradiance computing system 702 may determine an irradiance level 703 indicating the solar irradiance for a particular unit area and geocoordinate the unit area to a map using map data 440. An example of map layers is further described with reference to FIGS. 8A-B.

By way of example, the irradiance computing system 702 may determine the irradiance level 703 of two unit areas in a parking lot and correlate the granular location of the two unit areas to a location on a map using map data 440 (e.g., coordinates, etc.). The irradiance computing system 702 may correlate the location of the two unit areas and the locations on a map and generate a map layer 704. A map layer 704 may include additional metadata integrated into a map. For instance, the map layer 704 may supplement map data 440 and indicate the solar irradiance levels 703 for respective positions (e.g., unit areas) on the map. The map layers 704 may be stored in the navigation system 435 such that the fleet of vehicles (e.g., their respective vehicle computing systems 200) may access them.

In an embodiment, the irradiance computing system 702 may obtain solar irradiance data from a remote computing system. For instance, the irradiance computing system 702 may obtain or otherwise access published solar irradiance data from remote databases (e.g., solar atlas, solar maps, etc.). The solar irradiance data may indicate average solar irradiance levels for a particular geographic area or portions thereof (e.g., zip codes, roads, parking lots, neighborhoods). By way of example, the irradiance computing system 702 may access a published solar map for the United States indicating the estimated potential daily and yearly power generation per unit area. In an embodiment, the solar irradiance data may provide additional input data for the irradiance detection model.

For instance, the irradiance detection model may process solar irradiance data and determine solar irradiance levels 703 based on the solar irradiance data. In some embodiments, the irradiance detection model may utilize fleet sensor data 701 and solar irradiance data to determine solar irradiance levels 703. In another embodiment, the irradiance detection model may utilize the solar irradiance data as training data. By way of example, the irradiance detection model may determine, based on the fleet sensor data 701 the solar irradiance for a particular unit area, output a solar irradiance level 703 indicating a measurement of the power per unit area, and compare the solar irradiance level 703 with a level of solar of irradiance indicated by the solar irradiance data. For instance, the solar irradiance data and fleet sensor data 701 may indicate a common time and location for which a solar irradiance level has been determined. As such the irradiance detection model may utilize solar irradiance data from one or more remote computing systems to increase confidence in determining solar irradiance levels 703 for a geographic area.

In an embodiment, the irradiance computing system 702 may continuously determine and update the irradiance levels 703 for unit areas within the geographic area as fleet sensor data 701 is accessed from the fleet of vehicles. In some embodiments, the irradiance computing system 702 may be configured to determine and update irradiance levels 703 on a cadence, dynamically, or on demand. For instance, one or more vehicle computing systems 200 may receive user input requesting map layer integrations 705 to generate updated map data 706. The map layer integrations 705 may include foundational map layers and map layers 704 generated by the irradiance computing system 702 integrated together. For instance, map layers 704 may be integrated with map data 440 including a foundational map layer to generated map layer integrations 705. An example of a map layer integration 705 is further described with reference to FIGS. 8A-C.

Vehicle computing systems 200 and/or the remote computing platform 110 may access map layer integrations by and generate updated map data 706. For instance, updated map data 706 may include map layers 704 indicating solar irradiance levels 703 for unit areas nearby and map data 440. In some embodiments, the updated map data 706 may indicate predicted charging potential (e.g., additional miles, etc.) for the respective vehicle. The updated map data 706 may be displayed on one or more user interfaces (e.g., a display device 345, user device 115, etc.) for the vehicle operator. An example of updated map data depicted on a user interface is further described with reference to FIG. 9.

Figure 8A:
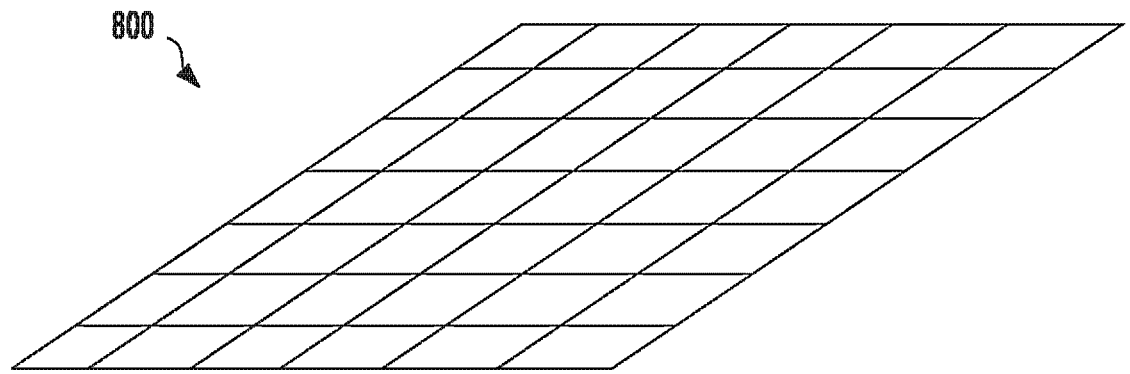
FIGS. 8A-8B illustrate example map layers according to an embodiment hereof.
Figure 8B:
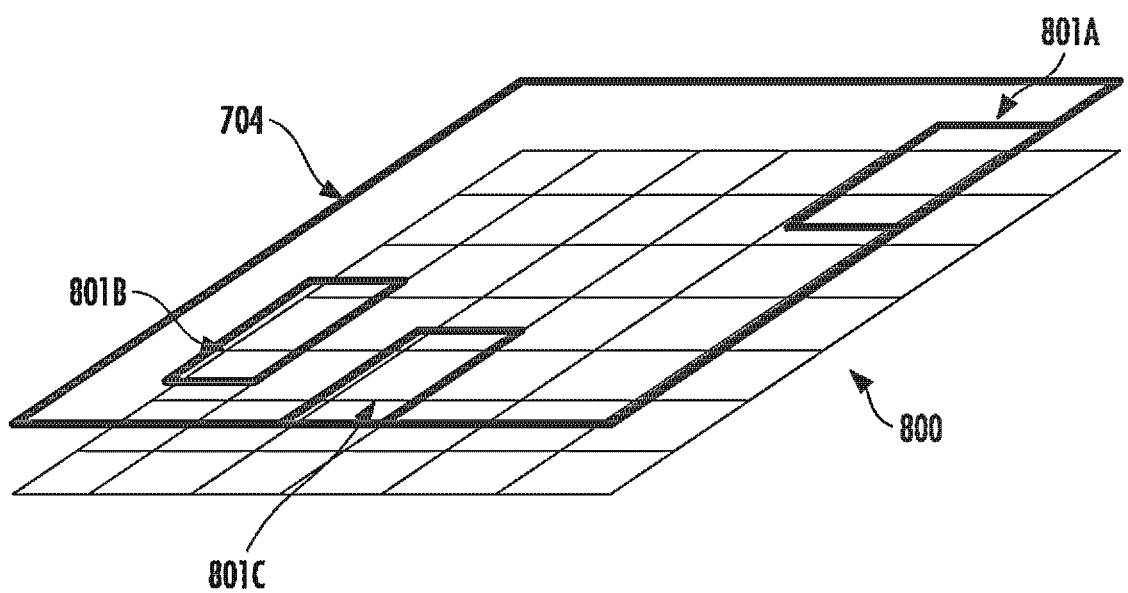

FIGS. 8A-8B illustrate example map layers according to an embodiment hereof. FIG. 8A depicts a geographic map layer 800 representing a geographic area or region (e.g., geographic area 600). The example geographic map layer 800 may be stored in a GIS (graphical information system) database containing groups of point, line, or area (polygon) features representing a particular class or type of real-world entities such as customers, streets, or postal codes. A GIS database may include a computer system that analyzes and displays geographically referenced information. For instance, the GIS database may use data (e.g., map data 440, map layers 704, etc.) that is attached to a unique locations (e.g., unit areas) to geographically display information. The geographic map layer 800 may include raster images such as those taken by satellites depicting a geographic area. In some embodiments, the geographic map layer 800 may be a base layer utilized by vehicle computing systems 200 to provide navigation and routing for vehicles.

As depicted in FIG. 8A, the geographic map layer 800 may include grid lines. The map grid lines may be a regularly spaced series of connected vertices that separate the geographic map layer 800 into equal area. In an embodiment, the geographic map layer 800 may be a system by which locations can be identified on the geographic map layer 800 using the x,y coordinates based on the lines. For instance, the grid lines map represent longitude and latitude lines. In some embodiments, the grid lines may space the geographic area into unit areas (e.g., square meters). For instance, the grid lines may be used to indicate solar irradiance levels within a particular unit area (e.g., one or more cells) when the geographic map layer 800 is integrated with one or more map layers 704.

For instance, the map layer 704 may include additional data such as irradiance levels 703 for unit areas represented by the geographic map layer 800. The map layer 704 may augment or supplement the geographic map layer 800 and provide geographically referenced irradiance levels throughout the geographic map layer. For example, unit areas 801A-C depict unit areas which include irradiance levels 703. The map layer 704 may be stored within the GIS database and integrated with the geographic map layer 800. As depicted by FIG. 8B, the map layer 704 may be layered on top of the geographic map layer 800 to accurately coordinate the unit areas 801A-C, irradiance levels 703 for the respective unit areas 801A-C, and the positions on the geographic map layer 800.

Figure 8C:
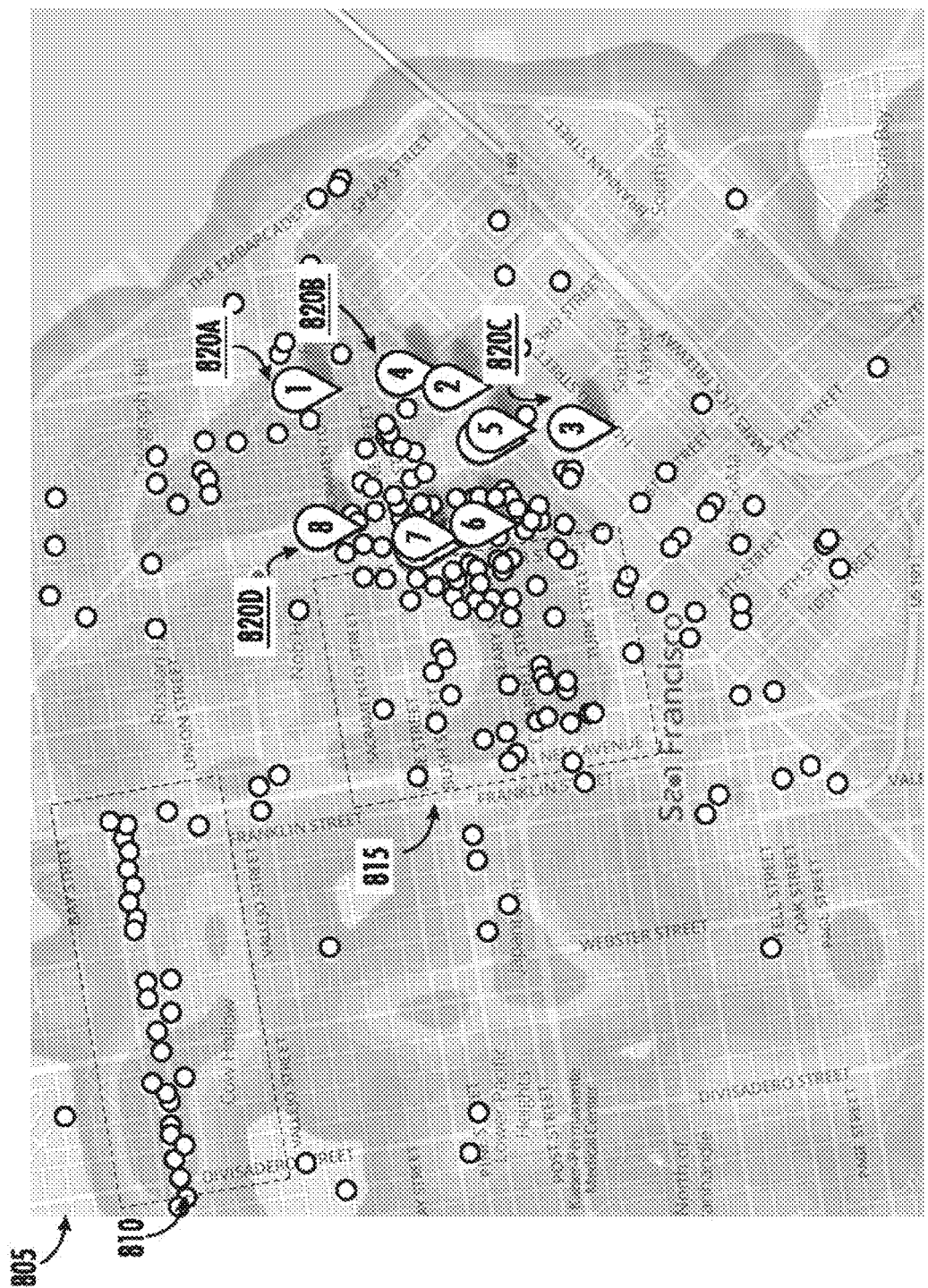
FIG. 8C illustrates an example map layer integration according to an embodiment hereof.

The integration of the map layer 704 and the geographic map layer 800 may be geographically displayed to include the foundational information of both layers. For instance, FIG. 8C illustrates an example map layer integration according to an embodiment hereof. The example map layer integration 805 depicts data from both a geographic map layer 800 and a map layer 704. For instance, data typically stored within a geographic map layer 800 such as streets and street names, geographic landmarks, waterways, etc. may be displayed along with data typically stored within a map layer 704 such as unit areas (e.g., unit areas 801A-C), suggested parking locations 820 (e.g., irradiance levels 703), color visualizations, etc. The map layer integration 805 may depict integrated information from one or more data sources.

The example map layer integration 805 depicts a first region 810 and a second region 815. The first region 810 and second region 815 may include one or more unit areas (e.g., unit areas 801A-C) where an irradiance level 703 has been determined. For instance, one or more vehicles of the fleet of vehicles depicted within the first region 810 and the second region 815 may have captured sensor data 310 utilized to determine an irradiance level for one or more unit areas within the first region 810 and the second region 815. The vehicles depicted may indicate vehicle currently posited within the first region 810 and the second region 815 or previously positioned within the first region 810 and the second region 815. For instance, the vehicles depicted first region 810 and the second region 815 may represent the location of sensor data utilized to determine an irradiance level within the first region 810 and the second region 815.

As depicted in FIG. 8C, one or more color visualizations may be shown to illustrate irradiance detected within the geographic area. For instance, the first region 810 and the second region 815 may include more color visualizations as a cluster of vehicles that captured sensor data 310 within the first region 810 and the second region 815 provide additional fleet sensor data 701 to more accurately detect solar irradiance.

The map layer integration 805 may also include the location of suggested parking locations 820 within the geographic map layer 800. For instance, the irradiance computing system 702 may determine suggested parking locations 820 which include parking locations with the most optimal irradiance level 703 for a respective vehicle. The map layer integration 805 may also indicate a ranking of suggested parking locations 820 based on the distance from the vehicle, estimated duration the vehicle will be parked (e.g., predicted irradiance over time), or user preferences. For instance, the map layer integration 805 may be stored in the navigation system 735 (e.g., GIS database) and accessed by vehicle computing systems 200. The vehicle computing systems 200 may utilize the map layer integration to generate updated map data 706 to be displayed for the vehicle operator. While the map layer integration 805 depicts suggested parking locations 820 integrated from a map layer 704, an integration of a map layer 704 and geographic map layer 800 may also depict which locations have low or no levels of solar irradiance.

Figure 9:
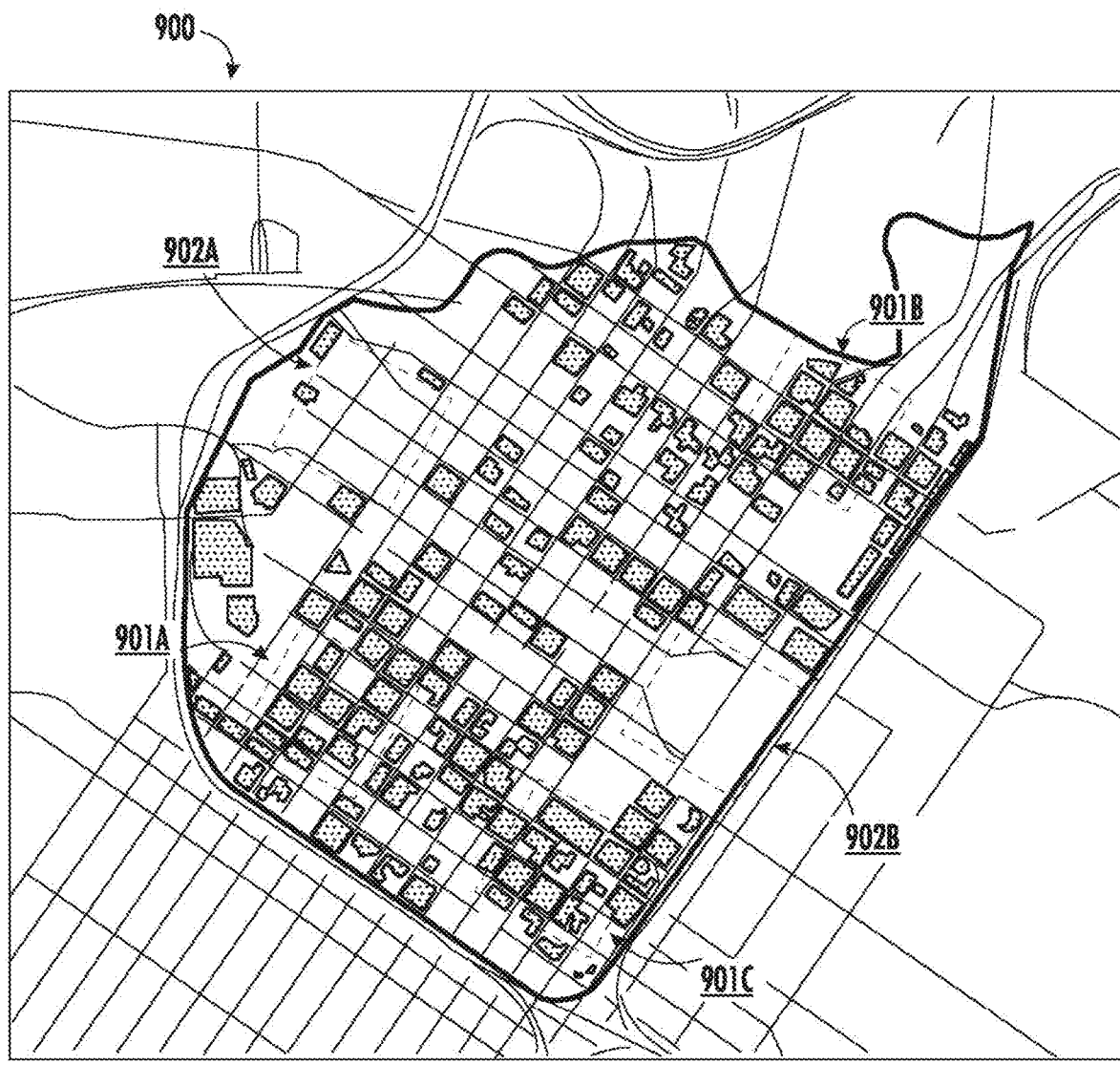
FIG. 9 illustrates an example user interface according to an embodiment hereof.

For instance, FIG. 9 illustrates an example user interface according to an embodiment hereof. The example user interface 900 may include a map displayed on one or more user interfaces (e.g., display device 345, user device 115, etc.) viewable by the vehicle operator. The example user interface 900 may depict updated map data 706 based on map layer integrations 705 accessed by the vehicle computing system 200.

As depicted in FIG. 9, the user interface 900 may include topographical indicators typically shown on a map to indicate the locations and positions of roadways, buildings, parking, and other infrastructure within a geographic area. The user interface may also include color visualizations indicating levels of solar irradiance. For instance, optimal regions 901A-C may indicate regions where solar irradiance levels 703 are high and charging potential is most optimal. The optimal regions 901A-C may include granular details. For instance, as a vehicle navigates towards one of the optimal regions 901A-C or a user provides user input (e.g., clicking selecting an optimal region 901A-C), additional information may be presented. Additional information may include granular irradiance levels per unit area (e.g., parking space level) that may be presented. In some embodiments, the optimal regions 901A-C may change over time. For instance, as irradiance levels 703 change over the course of the day (e.g., 0% during nighttime hours), the user interface 900 may update the color visualizations and/or optimal regions to indicate current irradiance levels 703.

For instance, the user interface 900 may include sub-optimal regions 902A-B. Sub-optimal regions 902A-B may indicate irradiance levels 703 below a threshold level (e.g., too low to provide any charging power). As such sub-optimal regions 702A-C may indicate regions where there is low charging potential for vehicles. In some embodiments, sub-optimal regions 902A-B may indicate that not enough sensor data 310 or fleet sensor data 701 has been processed to determine an irradiance level 703. For instance, the irradiance computing system 702 may require a threshold amount of fleet sensor data 701 to determine irradiance level calculations are internally consistent.

The user interface 900 may be updated as the vehicle computing system 200 generates updated map data 706. For instance, as the vehicle computing system 200 for respective vehicles receives map layer integrations 705, updated map data 706 may be used to update user interface 900 with the most recent irradiance level 703 determinations.

Figure 10:
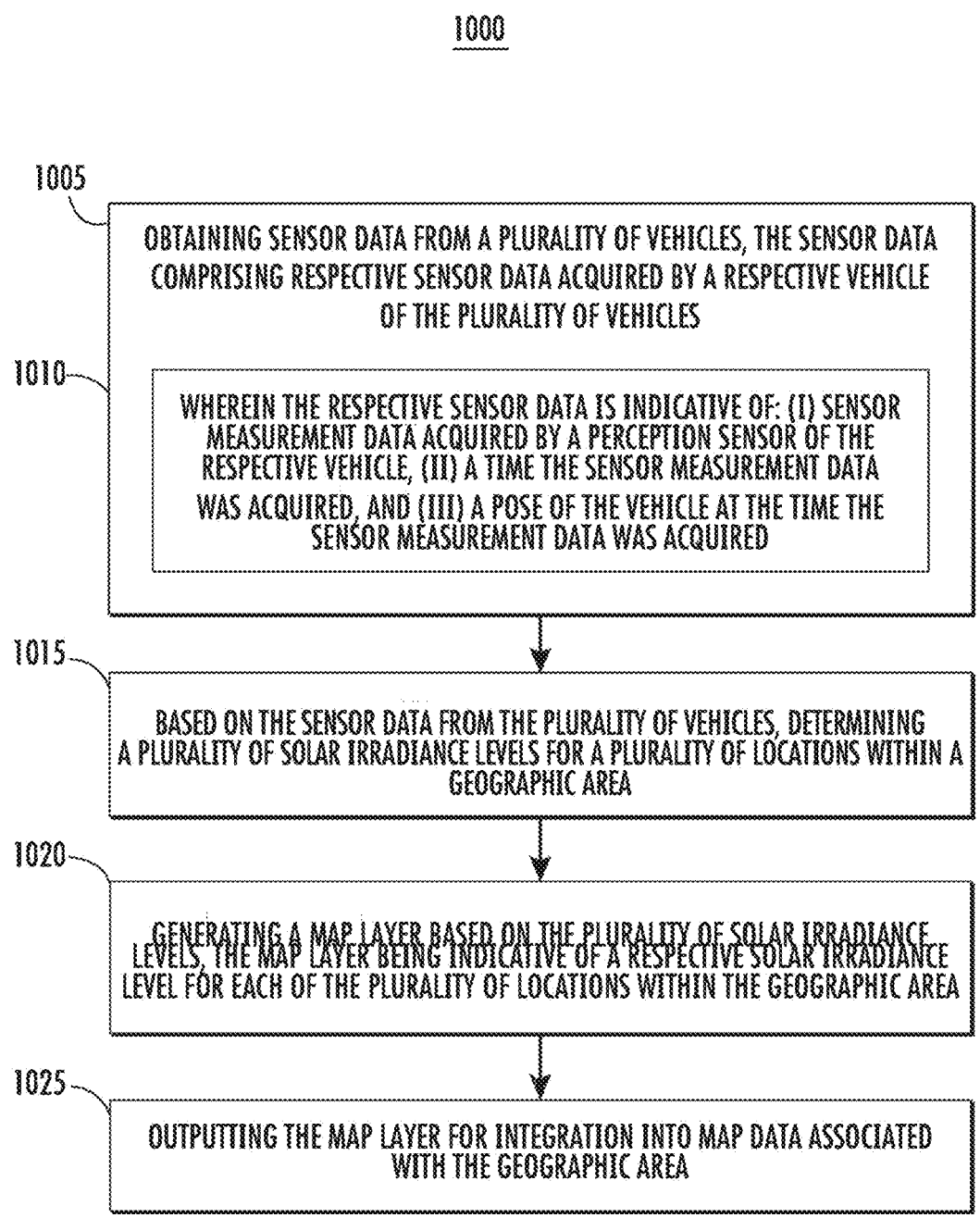
FIG. 10 illustrates a flowchart diagram of an example method according to an embodiment hereof.

FIG. 10 illustrates a flowchart diagram of an example method 1000 according to an embodiment hereof. The method 1000 may be performed by a computing system described with reference to the other figures. In an embodiment, the method 1000 may be performed by the control circuit 6015 of the computing system 6005 of FIG. 11. One or more portions of the method 1000 may be implemented as an algorithm on the hardware components of the devices described herein (e.g., as in FIGS. 1, 4, 5, 11, etc.). For example, the steps of method 1000 may be implemented as operations/instructions that are executable by computing hardware.

FIG. 10 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 10 is described with reference to elements/terms described with respect to other systems and figures for example illustrated purposes and is not meant to be limiting. One or more portions of method 1000 may be performed additionally, or alternatively, by other systems. For example, method 1000 may be performed by a control circuit of the remote computing platform 110, the vehicle computing system 200, the user device 115, and so on.

In an embodiment, the method 1000 may begin with or otherwise include an operation 1005, in which the remote computing platform 110 obtains sensor data from a plurality of vehicles, the sensor data including respective sensor data acquired by a respective vehicle of the plurality of vehicles. For instance, a fleet of vehicles within a geographic area 600 may capture sensor data 310 of their surrounding environment as they traverse the geographic area 600 or while parked.

An irradiance computing system 702 running on one or more servers of the remote computing system 110 may obtain fleet sensor data 701 from a plurality of vehicles. The fleet sensor data 701 may include unprocessed or processed data and may include various modalities. For instance, the fleet sensor data 701 may include image data, LIDAR data, RADAR data, etc. In some examples, the fleet sensor data 701 may be aggregated sensor data 310 captured by one or more vehicles (e.g., vehicle computing systems 200) of the fleet of vehicles. For instance, fleet sensor data 701 can include sensor data 310 aggregated from a plurality of vehicles within threshold proximity (e.g., unit area) within the geographic area 600. Fleet sensor data 701 can include sensor data 310 captured by one or more vehicles respectively within a unit area concurrently or over a period of time.

In an embodiment, the method 1100 may include an operation 1010, wherein the respective sensor data is indicative of: (i) sensor measurement data acquired by a perception sensor of the respective vehicle, (ii) a time the sensor measurement data was acquired, and (iii) a pose of the vehicle at the time the sensor measurement data was acquired. For instance, the fleet sensor data 701 may include sensor data 310 captured by one or more sensors of the sensor system 305. By way of example, a camera sensor within the sensor system 305 may capture one or more images or videos of the surrounding environment. For instance, an infrared camera (e.g., within the sensor system 305) may capture an image of light reflecting off a nearby vehicle. The infrared image may measure the infrared (IR) spectrum present on the nearby vehicle.

As the infrared camera captures the infrared image, the vehicle computing system 200 of the respective vehicle may generate a datetime stamp indicating the day and time the images were captured. The datetime stamp may be used during processing of the sensor data 310. For instance, a second vehicle of the plurality of vehicles may also capture sensor data of the nearby vehicle using a different sensor (e.g., LIDAR, RADAR, ultrasonic sensors, etc.). The sensor data 310 captured by the vehicles may be aggregated based on the datetime stamp and obtained by the irradiance computing system 702 for processing.

Sensor data 310 may also be associated with a pose of the vehicle at the time the sensor data was captured. For instance, the positioning system 315 of the vehicle may generate a pose (e.g., the position and orientation of the vehicle in three dimension space). The pose of the vehicle can provide additional context associated with sensor data 310 captured by the sensor system 305. By way of example, the infrared camera may capture an infrared image while traveling at a high rate of speed. For instance, the nearby vehicle captured in the image may also be traveling at a high rate of speed and may have an effect the IR measurements. As such, a vehicle pose associated with sensor data 310 may provide additional context for data processing.

In an embodiment, the method 1100 may include an operation 1115, in which the remote computing platform 110, based on the sensor data from the plurality of vehicles, determines a plurality of solar irradiance levels for a plurality of locations within a geographic area. For instance, the irradiance computing system 702 may include one or more machine-learned irradiance detection models configured to utilize the fleet sensor data 701 to generate output indicative of an irradiance level 703. The irradiance level 703 may indicate actual solar irradiance depicted with the sensor data 310 or predicted solar irradiance at a future time.

By way of example, the irradiance detection model may analyze an image of the surrounding environment and detect one or more sunlit regions. As an example, the sunlit regions may be depicted as brighter regions within an infrared image. Based on detecting sunlit regions, the irradiance detection model may perform one or more segmentation techniques to distinguish "sunlit regions" and "non-sunlit regions". In an embodiment, additional analysis may be performed to determine whether IR measurements depicted within the infrared image are consistent with sunlight. For instance, the irradiance detections model may semantically classify pixels as sunlit and determine an intensity of solar irradiance.

In an embodiment, the irradiance computing system 702 may determine an irradiance level 703 depicted within sensor data 310 from. For instance, an irradiance level 703 may include a measure of solar irradiance (e.g., power per unit area) depicted within an image frame or other type of sensor data 310. The irradiance level 703 may be determined for a single image or a plurality of images within sensor data 310. In some embodiments, fleet sensor data 701 may include one or more images (e.g., optical images, infrared images, videos, etc.) of the same unit area. For instance, the sensor data 310 for a unit area may be captured at the same or substantially the same datetime. In some embodiments, the sensor data 310 may be captured over a period of days and times.

The irradiance computing system 702 may determine, based on detected irradiance levels 703 within a single image frame or a plurality of image frames an irradiance level for a particular unit area. In some embodiments, the irradiance computing system 702 may predict a future irradiance level 703 for a unit area. For instance, the irradiance detection model may access weather data (e.g., cloud coverage, etc.) and other databases or models analyzing Earth's atmosphere for a specific time and/or geocoordinate over the course of several days. The irradiance detection model may predict, based on historical trends (e.g., sensor data 310, fleet sensor data 701, etc.), a future irradiance level for a unit area.

For instance, the irradiance detection model may receive feedback from vehicles based on actual solar irradiance detected in a particular unit area. By way of example, the irradiance detection model may predict a low irradiance level 703 based on detecting non-sunlit regions above a threshold within fleet sensor data 701 for a unit area and weather data indicating mostly cloudy skies. For instance, a vehicle may capture solar energy within the unit area and the solar power within the unit area may indicate a low solar irradiance. Based on detecting non-sunlit regions above a threshold and actual solar irradiance measurements, the irradiance detection model may predict low irradiance levels 703 for the particular unit area when there are similar future conditions (e.g., non-sunlit regions above a threshold, mostly cloudy skies, etc.). As more vehicles of the fleet of vehicles capture fleet sensor data 701, the irradiance detection model may continuously improve predictions of future irradiance levels 703 for unit areas.

In an embodiment, the method 1100 may include an operation 1120, in which the remote computing platform 110 generates a map layer based on the plurality of solar irradiance levels, the map layer being indicative of a respective solar irradiance level for each of the plurality of locations within the geographic area. For instance, the irradiance computing system 702 may determine an irradiance level 703 indicating the solar irradiance for a particular unit area and geocoordinate the unit area to a map using map data 440.

By way of example, the irradiance computing system 702 may determine the irradiance level 703 of a unit area and correlate the granular location of the unit area to a location on a map using map data 440 (e.g., coordinates, etc.). The irradiance computing system 702 may correlate the location of the unit area and the locations on a map and generate a map layer 704. A map layer 704 may include additional metadata integrated into a map. For instance, the map layer 704 may supplement map data 440 and indicate the solar irradiance levels 703 for respective positions (e.g., unit areas) on the map. The map layers 704 may be stored in the navigation system 435 such that the fleet of vehicles (e.g., their respective vehicle computing systems 200) may access them.

In some embodiments, the map layer 704 may indicate irradiance levels 703 at a point in time (e.g., current irradiance levels). In some embodiments, the map layer 704 may indicate irradiance levels 703 over a period of time (e.g., predicted irradiance levels). For instance, a vehicle may be parked within a particular unit area for several hours. The map layer 704 may aggregate the total irradiance level 703 for the particular unit area over the course of the serval hours.

In an embodiment, the method 1100 may include an operation 1125, in which the remote computing platform 110 outputs the map layer for integration into map data associated with the geographic area. For instance, the irradiance level 703 can be used to generate a map layer 704. The irradiance computing system 702 may determine an irradiance level 703 indicating the solar irradiance for a particular unit area and geocoordinate the unit area to a map using map data 440. The resulting geocoordinates can be used to generate a map layer 704.

By way of example, a map layer integration 805 may be generated and include data from both a geographic map layer 800 and a map layer 704. For instance, data typically stored within a geographic map layer 800 such as streets and street names, geographic landmarks, waterways, etc. may be displayed along with data typically stored within a map layer 704 such as unit areas (e.g., unit areas 801A-C), suggested parking locations 820 (e.g., irradiance levels 703), color visualizations, etc. The geographic map layer 800 or another map layer that indicates specific parking locations can be integrated with the map layer 704 to expose the information provided by the map layer 704 per individual parking space. The map layer integration 805 may depict integrated information from one or more data sources.

Figure 11:
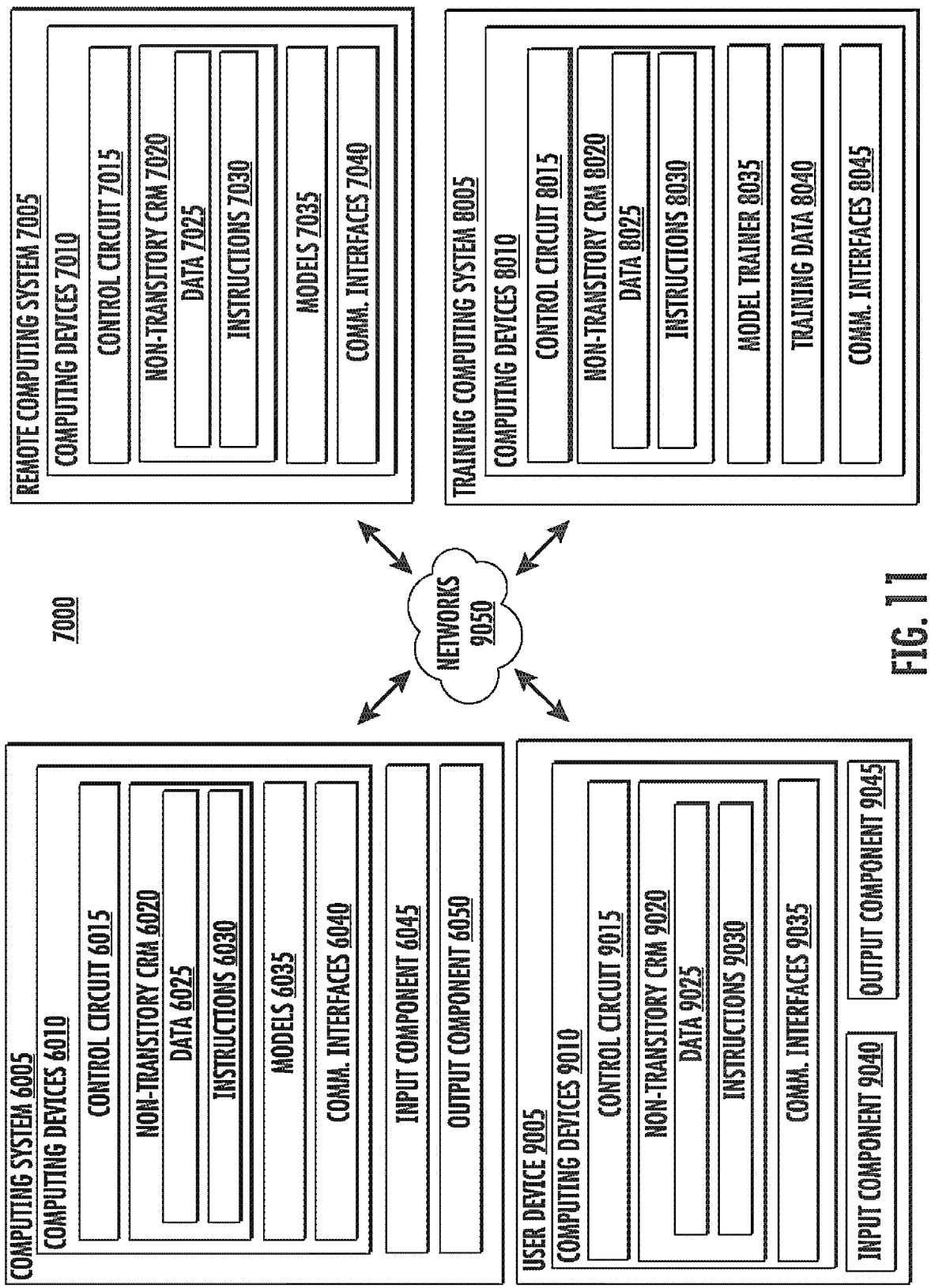
FIG. 11 illustrates a diagram of an example computing ecosystem with computing components according to an embodiment hereof.

FIG. 11 illustrates a block diagram of an example computing system 7000 according to an embodiment hereof. The system 7000 includes a computing system 6005 (e.g., a computing system onboard a vehicle), a remote computing system 7005 (e.g., a server computing system, cloud computing platform), a user device 9005 (e.g., a user's mobile device), and a training computing system 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 6020 may store computer-executable instructions or computer-readable instructions, such as instructions to perform at least a portion of the method of FIG. 11.

In an embodiment, the computing system 6005 may store or include one or more machine-learned models 6035. For example, the machine-learned models 6035 may be or may otherwise include various machine-learned models. In an embodiment, the machine-learned models 6035 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). As another example, the machine-learned models 6035 can include generative models, such as stable diffusion models, generative adversarial networks (GAN), GPT models, and other suitable models.

In an aspect of the present disclosure, the models 6035 may be used to produce map layers of solar irradiance for locations within a geographic area. For example, the machine-learned models 6035 can, in response to sensor data from a plurality of vehicles descriptive of measurement data and a pose of the plurality of vehicles, produce a map layer indicative of a plurality of solar irradiance levels for a plurality of locations within the geographic area to be integrated into map data.

In an embodiment, the one or more machine-learned models 6035 may be received from the remote computing system 7005 over networks 9050, stored in the computing system 6005 (e.g., non-transitory computer-readable medium 6020), and then used or otherwise implemented by the control circuit 6015. In an embodiment, the computing system 6005 may implement multiple parallel instances of a single model.

Additionally, or alternatively, one or more machine-learned models 6035 may be included in or otherwise stored and implemented by the remote computing system 7005 that communicates with the computing system 6005 according to a client-server relationship. For example, the machine-learned models 6035 may be implemented by the remote computing system 7005 as a portion of a web service. Thus, one or more models 6035 may be stored and/or implemented (e.g., as models 7035) at the computing system 6005 and/or one or more models 6035 may be stored and implemented at the remote computing system 7005.

The computing system 6005 may include one or more communication interfaces 6040. The communication interfaces 6040 may be used to communicate with one or more other systems. The communication interfaces 6040 may include any circuits, components, software, etc. for communicating via one or more networks (e.g., networks 9050). In some implementations, the communication interfaces 6040 may include for example, one or more of a communications controller, receiver, transceiver, transmitter, port, conductors, software and/or hardware for communicating data/information.

The computing system 6005 may also include one or more user input components 6045 that receives user input. For example, the user input component 6045 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6050. The output components 6050 may include hardware and/or software for audibly or visually producing content. For instance, the output components 6050 may include one or more speakers, earpieces, headsets, handsets, etc. The output components 6050 may include a display device, which may include hardware for displaying a user interface and/or messages for a user. By way of example, the output component 6050 may include a display screen, CRT, LCD, plasma screen, touch screen, TV, projector, tablet, and/or other suitable display components.

The remote computing system 7005 may include one or more computing devices 7010. In an embodiment, the remote computing system 7005 may include or is otherwise implemented by one or more server computing devices. In instances in which the remote computing system 7005 includes plural server computing devices, such server computing devices may operate according to sequential computing architectures, parallel computing architectures, or some combination thereof.

The remote computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the server system 7005 may obtain data from one or more memories that are remote from the server system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the method of FIG. 10.

The remote computing system 7005 may include one or more communication interfaces 7040. The communication interfaces 7040 may be used to communicate with one or more other systems. The communication interfaces 7040 may include any circuits, components, software, etc. for communicating via one or more networks (e.g., networks 7050). In some implementations, the communication interfaces 7040 may include for example, one or more of a communications controller, receiver, transceiver, transmitter, port, conductors, software and/or hardware for communicating data/information.

The computing system 6005 and/or the remote computing system 7005 may train the models 6035, 7035 via interaction with the training computing system 8005 that is communicatively coupled over the networks 9050. The training computing system 8005 may be separate from the remote computing system 7005 or may be a portion of the remote computing system 7005.

The training computing system 8005 may include one or more computing devices 8010. In an embodiment, the training computing system 8005 may include or is otherwise implemented by one or more server computing devices. In instances in which the training computing system 8005 includes plural server computing devices, such server computing devices may operate according to sequential computing architectures, parallel computing architectures, or some combination thereof.

The training computing system 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, and/or stored. The data 8025 may include, for instance, any of the data or information described herein. In some implementations, the training computing system 8005 may obtain data from one or more memories that are remote from the training computing system 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the method of FIG. 10.

The training computing system 8005 may include a model trainer 8035 that trains the machine-learned models 6035, 7035 stored at the computing system 6005 and/or the remote computing system 7005 using various training or learning techniques. For example, the models 6035, 7035 (e.g., a machine-learned generative model) may be trained using a loss function that evaluates quality of generated map layer samples over various characteristics, such as similarity to the training data.

The training computing system 8005 may modify parameters of the models 6035, 7035 (e.g., the machine-learned clustering model 320) based on the loss function (e.g., generative loss function) such that the models 6035, 7035 may be effectively trained for specific applications in a supervised manner using labeled data and/or in an unsupervised manner.

In an example, the model trainer 8035 may backpropagate the loss function through the machine-learned clustering model 320 to modify the parameters (e.g., weights) of the generative model (e.g., 620). The model trainer 8035 may continue to backpropagate the clustering loss function through the machine-learned model, with or without modification of the parameters (e.g., weights) of the model. For instance, the model trainer 8035 may perform a gradient descent technique in which parameters of the machine-learned model may be modified in a direction of a negative gradient of the clustering loss function. Thus, in an embodiment, the model trainer 8035 may modify parameters of the machine-learned model based on the loss function.

The model trainer 8035 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 8035 may perform a number of generalization techniques (e.g., weight decays, dropouts, etc.) to improve the generalization capability of a model being trained. In particular, the model trainer 8035 may train the machine-learned models 6035, 7035 based on a set of training data 8040.

The training data 8040 may include unlabeled training data for training in an unsupervised fashion. Furthermore, in some implementations, the training data 8040 can include labeled training data for training in a supervised fashion. For example, the training data 8040 can be or can include the sensor data 310 and map layers 704 of FIG. 7.

In an embodiment, if the user has provided consent/authorization, training examples may be provided by the computing system 6005 (e.g., of the user's vehicle). Thus, in such implementations, a model 6035 provided to the computing system 6005 may be trained by the training computing system 8005 in a manner to personalize the model 6035.

The model trainer 8035 may include computer logic utilized to provide desired functionality. The model trainer 8035 may be implemented in hardware, firmware, and/or software controlling a general-purpose processor. For example, in an embodiment, the model trainer 8035 may include program files stored on a storage device, loaded into a memory and executed by one or more processors. In other implementations, the model trainer 8035 may include one or more sets of computer-executable instructions that are stored in a tangible computer-readable storage medium such as RAM, hard disk, or optical or magnetic media.

The training computing system 8005 may include one or more communication interfaces 8045. The communication interfaces 8045 may be used to communicate with one or more other systems. The communication interfaces 8045 may include any circuits, components, software, etc. for communicating via one or more networks (e.g., networks 9050). In some implementations, the communication interfaces 8045 may include for example, one or more of a communications controller, receiver, transceiver, transmitter, port, conductors, software and/or hardware for communicating data/information.

The computing system 6005, the remote computing system 7005, and/or the training computing system 8005 may also be in communication with a user device 9005 that is communicatively coupled over the networks 9050.

The user device 9005 may include one or more computing devices 9010. The user device 9005 may include a control circuit 9015 and a non-transitory computer-readable medium 9020, also referred to herein as memory 9020. In an embodiment, the control circuit 9015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 9015 may be programmed by one or more computer-readable or computer-executable instructions stored on the non-transitory computer-readable medium 9020.

In an embodiment, the non-transitory computer-readable medium 9020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 9020 may store information that may be accessed by the control circuit 9015. For instance, the non-transitory computer-readable medium 9020 (e.g., memory devices) may store data 9025 that may be obtained, received, accessed, written, manipulated, created, and/or stored. The data 9025 may include, for instance, any of the data or information described herein. In some implementations, the user device 9005 may obtain data from one or more memories that are remote from the user device 9005.

The non-transitory computer-readable medium 9020 may also store computer-readable instructions 9030 that may be executed by the control circuit 9015. The instructions 9030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 9015 to perform one or more functional tasks. The modules and computer-readable/executable instructions may be described as performing various operations or tasks when the control circuit 9015 or other hardware component is executing the modules or computer-readable instructions.

The instructions 9030 may be executed in logically or virtually separate threads on the control circuit 9015. For example, the non-transitory computer-readable medium 9020 may store instructions 9030 that when executed by the control circuit 9015 cause the control circuit 9015 to perform any of the operations, methods and/or processes described herein. In some cases, the non-transitory computer-readable medium 9020 may store computer-executable instructions or computer-readable instructions, such as instructions to perform at least a portion of the method of FIG. 11.

The user device 9005 may include one or more communication interfaces 9035. The communication interfaces 9035 may be used to communicate with one or more other systems. The communication interfaces 9035 may include any circuits, components, software, etc. for communicating via one or more networks (e.g., networks 7050). In some implementations, the communication interfaces 9035 may include for example, one or more of a communications controller, receiver, transceiver, transmitter, port, conductors, software and/or hardware for communicating data/information.

The user device 9005 may also include one or more user input components 9040 that receives user input. For example, the user input component 9040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 9005 may include one or more output components 9045. The output components 9045 may include hardware and/or software for audibly or visually producing content. For instance, the output components 9045 may include one or more speakers, earpieces, headsets, handsets, etc. The output components 9045 may include a display device, which may include hardware for displaying a user interface and/or messages for a user. By way of example, the output component 9045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

ADDITIONAL DISCUSSION OF VARIOUS EMBODIMENTS

Embodiment 1 relates to a computing system of a vehicle. The computing system may include a control circuit. The control circuit may be configured to obtain sensor data from a plurality of vehicles, the sensor data including respective sensor data acquired by a respective vehicle of the plurality of vehicles, wherein the respective sensor data is indicative of: (i) sensor measurement data acquired by a perception sensor of the respective vehicle, (ii) a time the sensor measurement data was acquired, and (iii) a pose of the vehicle at the time the sensor measurement data was acquired. The control circuit may be configured to, based on the sensor data from the plurality of vehicles, determine a plurality of solar irradiance levels for a plurality of locations within a geographic area. The control circuit may be configured to generate a map layer based on the plurality of solar irradiance levels, the map layer being indicative of a respective solar irradiance level for each of the plurality of locations within the geographic area. The control circuit is configured to output the map layer for integration into map data associated with the geographic area.

Embodiment 2 includes the computing system of Embodiment 1. In this embodiment, the plurality of vehicles includes at least one of: one or more electric vehicles or one or more hybrid electric vehicles.

Embodiment 3 includes the computing system of any of Embodiments 1 or 2. In this embodiment, the time the sensor measurement data was acquired is indicative of least at one of: a date on which the sensor measurement data was acquired or a time of day the sensor measurement data was acquired.

Embodiment 4 includes the computing system of any of Embodiments 1 to 3. In this embodiment, the sensor measurement data acquired by the perception sensor includes at least one of: image data of an environment of the respective vehicle, wherein the image data was acquired using a camera of the respective vehicle; LIDAR data of the environment of the respective vehicle, wherein the LIDAR data was acquired using a LIDAR sensor of the respective vehicle; RADAR data of the environment of the respective vehicle, wherein the RADAR data was acquired using a RADAR sensor of the respective vehicle; or ultrasonic data of the environment of the respective vehicle, wherein the ultrasonic data was acquired using an ultrasonic sensor of the respective vehicle.

Embodiment 5 includes the computing system of any of Embodiments 1 to 4. In this embodiment, the camera of the respective vehicle includes an optical camera or an infrared camera.

Embodiment 6 includes the computing system of any of Embodiments 1 to 5. In this embodiment, control circuit may be configured to obtain, from a remote computing system, published solar irradiance data associated with the geographic area, wherein the published solar irradiance data is indicative of one or more average solar irradiance levels for one or more portions of the geographic area. In this embodiment, determining the plurality of solar irradiance levels for the plurality of locations within the geographic area includes determining at least one solar irradiance level for at least one location based on the published solar irradiance data.

Embodiment 7 includes the computing system of any of Embodiments 1 to 6. In this embodiment, the control circuit may be configured to obtain weather data associated with the geographic area. In this embodiment, determining the plurality of solar irradiance levels includes determining the plurality of solar irradiance levels for the plurality of locations based on the weather data.

Embodiment 8 includes the computing system of any of Embodiments 1 to 7. In this embodiment, generating the map layer includes generating a grid data structure based on the sensor data, the grid data structure indicating a respective solar irradiance level for a respective location of the plurality of locations via one or more cells of the grid data structure.

Embodiment 9 includes the computing system of any of Embodiments 1 to 8. In this embodiment, the respective solar irradiance level for a respective location is indicative of a power per unit area.

Embodiment 10 includes the computing system of any of Embodiments 1 to 9. In this embodiment, the map data includes a parking space layer, the parking space layer being configured to combine with the map layer to indicate a solar irradiance level associated with a parking space within the geographic area.

Embodiment 11 includes the computing system of any of Embodiments 1 to 10. In this embodiment, at least a portion of the respective sensor data is processed onboard the respective vehicle and provided to the computing system by the respective vehicle.

Embodiment 12 includes the computing system of any of Embodiments 1 to 11. In this embodiment, outputting the map layer includes at least one of: outputting the map layer for use within the map data in a human-machine interface or outputting the map layer for storage in a memory with the map data.

Embodiment 13 relates to a computer-implemented method. In this embodiment, the method can include obtaining sensor data from a plurality of vehicles, the sensor data including respective sensor data acquired by a respective vehicle of the plurality of vehicles, wherein the respective sensor data is indicative of: (i) sensor measurement data acquired by a perception sensor of the respective vehicle, (ii) a time the sensor measurement data was acquired, and (iii) a pose of the vehicle at the time the sensor measurement data was acquired. In this embodiment, the method can include, based on the sensor data from the plurality of vehicles, determining a plurality of solar irradiance levels for a plurality of locations within a geographic area. In this embodiment, the method can include generating a map layer based on the plurality of solar irradiance levels, the map layer being indicative of a respective solar irradiance level for each of the plurality of locations within the geographic area. In this embodiment, the method can include outputting the map layer for integration into map data associated with the geographic area.

Embodiment 14 includes the method of Embodiment 13. In this Embodiment, the time the sensor measurement data was acquired is indicative of least at one of: a date on which the sensor measurement data was acquired or a time of day the sensor measurement data was acquired.

Embodiment 15 includes the method of any of Embodiment 13 to 14. In this Embodiment, the sensor measurement data acquired by the perception sensor includes at least one of: image data of an environment of the respective vehicle, wherein the image data was acquired using a camera of the respective vehicle; LIDAR data of the environment of the respective vehicle, wherein the LIDAR data was acquired using a LIDAR sensor of the respective vehicle; RADAR data of the environment of the respective vehicle, wherein the RADAR data was acquired using a RADAR sensor of the respective vehicle; or ultrasonic data of the environment of the respective vehicle, wherein the ultrasonic data was acquired using an ultrasonic sensor of the respective vehicle.

Embodiment 16 includes the method of any of Embodiment 13 to 15. In this Embodiment, the method can include obtaining, from a remote computing system, published solar irradiance data associated with the geographic area, wherein the published solar irradiance data is indicative of one or more average solar irradiance levels for one or more portions of the geographic area. In this Embodiment, the method can include, determining the plurality of solar irradiance levels for the plurality of locations within the geographic area includes determining at least one solar irradiance level for at least one location based on the published solar irradiance data.

Embodiment 17 includes the method of any of Embodiment 13 to 16. In this Embodiment, generating a grid data structure based on the sensor data, the grid data structure indicating a respective solar irradiance level for a respective location of the plurality of locations via one or more cells of the grid data structure.

Embodiment 18 includes the method of any of Embodiment 13 to 17. In this Embodiment, outputting the map layer includes outputting the map layer for use within the map data in a vehicle human-machine interface.

Embodiment 19 includes the method of any of Embodiment 13 to 18. In this Embodiment, the method can include outputting the map layer for storage in a memory with the map data.

Embodiment 20 is directed to one or more non-transitory computer-readable media. The one or more non-transitory computer readable media can store instructions that are executable by a control circuit. In this Embodiment, the control circuit executing the instructions can obtain sensor data from a plurality of vehicles, the sensor data including respective sensor data acquired by a respective vehicle of the plurality of vehicles, wherein the respective sensor data is indicative of: (i) sensor measurement data acquired by a perception sensor of the respective vehicle, (ii) a time the sensor measurement data was acquired, and (iii) a pose of the vehicle at the time the sensor measurement data was acquired. In this Embodiment, the control circuit executing the instructions can, based on the sensor data from the plurality of vehicles, determine a plurality of solar irradiance levels for a plurality of locations within a geographic area. In this Embodiment, the control circuit executing the instructions can generate a map layer based on the plurality of solar irradiance levels, the map layer being indicative of a respective solar irradiance level for each of the plurality of locations within the geographic area. In this Embodiment, the control circuit executing the instructions can output the map layer for integration into map data associated with the geographic area.

ADDITIONAL DISCLOSURE

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system comprising:
   a control circuit comprising one or more processors configured to perform operations to:
   obtain sensor data from a plurality of vehicles, the sensor data comprising respective sensor data acquired by respective vehicles of the plurality of vehicles, wherein the respective sensor data is indicative of: (i) sensor measurement data acquired by a perception sensor of the respective vehicles, (ii) a time the sensor measurement data was acquired, and (iii) a pose of the respective vehicles at the time the sensor measurement data was acquired, and wherein the sensor data comprises respective metadata indicative of: (i) sensor position of the perception sensor on the respective vehicles, (ii) vehicle type of the respective vehicles, and (iii) sensor modality of the perception sensor;
   based on the sensor data, determine a plurality of solar irradiance levels for a plurality of locations within a geographic area, wherein determining the plurality of solar irradiance levels comprises:
   processing the sensor data to determine one or more sunlit regions and associated infrared measurements depicted in the sensor data; and
   analyzing the one or more sunlit regions to determine whether the infrared measurements are consistent with sunlight;
   generate a map layer based on the plurality of solar irradiance levels, the map layer being indicative of a respective solar irradiance level of respective sunlit regions of the one or more sunlit regions within the geographic area; and
   output the map layer to the plurality of vehicles or other vehicles that are in addition to the plurality of vehicles, wherein the plurality of vehicles or the other vehicles update map data by integrating the map layer to facilitate an estimation of solar charging potential for the plurality of locations within the geographic area, and wherein at least one vehicle of the plurality of vehicles or the other vehicles displays, on a user interface display, the updated map data indicating the estimated solar charging potential for the plurality of locations within the geographic area.

2. The computing system of claim 1, wherein the plurality of vehicles comprise at least one of: one or more electric vehicles or one or more hybrid electric vehicles.

3. The computing system of claim 1, wherein the time the sensor measurement data was acquired is indicative of at least one of: a date on which the sensor measurement data was acquired or a time of day the sensor measurement data was acquired.

4. The computing system of claim 1, wherein the sensor measurement data acquired by the perception sensor comprises at least one of: image data of an environment of the respective vehicle, wherein the image data was acquired using a camera of the respective vehicle; LIDAR data of the environment of the respective vehicle, wherein the LIDAR data was acquired using a LIDAR sensor of the respective vehicle; RADAR data of the environment of the respective vehicle, wherein the RADAR data was acquired using a RADAR sensor of the respective vehicle; or ultrasonic data of the environment of the respective vehicle, wherein the ultrasonic data was acquired using an ultrasonic sensor of the respective vehicle.

5. The computing system of claim 4, wherein the camera of the respective vehicle comprises an optical camera or an infrared camera.

6. The computing system of claim 1, wherein the one or more processors are further configured to perform operations to:
   obtain, from a remote computing system, published solar irradiance data associated with the geographic area, wherein the published solar irradiance data is indicative of one or more average solar irradiance levels for one or more portions of the geographic area, and wherein determining the plurality of solar irradiance levels for the plurality of locations within the geographic area further comprises determining at least one solar irradiance level for at least one location based on the published solar irradiance data.

7. The computing system of claim 1, wherein the one or more processors are further configured to perform operations to obtain weather data associated with the geographic area, and wherein determining the plurality of solar irradiance levels further comprises determining the plurality of solar irradiance levels for the plurality of locations further based on the weather data.

8. The computing system of claim 1, wherein generating the map layer comprises generating a grid data structure based on the sensor data, the grid data structure indicating a respective solar irradiance level for a respective location of the plurality of locations via one or more cells of the grid data structure.

9. The computing system of claim 1, wherein at least a portion of the respective sensor data is processed onboard the respective vehicle and provided to the computing system by the respective vehicle.

10. The computing system of claim 1, wherein outputting the map layer further comprises at least one of: outputting the map layer for use within the map data in a human-machine interface or outputting the map layer for storage in a memory with the map data.

11. A computer-implemented method comprising:
    obtaining sensor data from a plurality of vehicles, the sensor data comprising respective sensor data acquired by respective vehicles of the plurality of vehicles, wherein the respective sensor data is indicative of: (i) sensor measurement data acquired by a perception sensor of the respective vehicles, (ii) a time the sensor measurement data was acquired, and (iii) a pose of the respective vehicles at the time the sensor measurement data was acquired, and wherein the sensor data comprises respective metadata indicative of: (i) sensor position of the perception sensor on the respective vehicles, (ii) vehicle type of the respective vehicles, and (iii) sensor modality of the perception sensor;
    based on the sensor data, determining a plurality of solar irradiance levels for a plurality of locations within a geographic area, wherein determining the plurality of solar irradiance levels comprises:
    processing the sensor data to determine one or more sunlit regions and associated infrared measurements depicted in the sensor data; and analyzing the one or more sunlit regions to determine whether the infrared measurements are consistent with sunlight;

generating a map layer based on the plurality of solar irradiance levels, the map layer being indicative of a respective solar irradiance level of respective sunlit regions of the one or more sunlit regions within the geographic area; and outputting the map layer to the plurality of vehicles or other vehicles that are in addition to the plurality of vehicles, wherein the plurality of vehicles or the other vehicles update map data by integrating the map layer to facilitate an estimation of solar charging potential for the plurality of locations within the geographic area, and wherein at least one vehicle of the plurality of vehicles or the other vehicles displays, on a user interface display, the updated map data indicating the estimated solar charging potential for the plurality of locations within the geographic area.

12. The computer-implemented method of claim 11, wherein the time the sensor measurement data was acquired is indicative of at least one of: a date on which the sensor measurement data was acquired or a time of day the sensor measurement data was acquired.

13. The computer-implemented method of claim 11, wherein the sensor measurement data acquired by the perception sensor comprises at least one of: image data of an environment of the respective vehicle, wherein the image data was acquired using a camera of the respective vehicle; LIDAR data of the environment of the respective vehicle, wherein the LIDAR data was acquired using a LIDAR sensor of the respective vehicle; RADAR data of the environment of the respective vehicle, wherein the RADAR data was acquired using a RADAR sensor of the respective vehicle; or ultrasonic data of the environment of the respective vehicle, wherein the ultrasonic data was acquired using an ultrasonic sensor of the respective vehicle.

14. The computer-implemented method of claim 11, further comprising:

obtaining, from a remote computing system, published solar irradiance data associated with the geographic area, wherein the published solar irradiance data is indicative of one or more average solar irradiance levels for one or more portions of the geographic area, and wherein determining the plurality of solar irradiance levels for the plurality of locations within the geographic area further comprises determining at least one solar irradiance level for at least one location based on the published solar irradiance data.

15. The computer-implemented method of claim 11, wherein generating the map layer comprises generating a grid data structure based on the sensor data, the grid data structure indicating a respective solar irradiance level for a respective location of the plurality of locations via one or more cells of the grid data structure.

16. The computer-implemented method of claim 11, wherein outputting the map layer further comprises outputting the map layer for use within the map data in a user interface of a user device.

17. The computer-implemented method of claim 11, wherein outputting the map layer further comprises outputting the map layer for storage in a memory with the map data.

18. One or more non-transitory computer-readable media that store instructions that, when executed by one or more processors of a control circuit, cause the one or more processors to perform operations comprising:

obtaining sensor data from a plurality of vehicles, the sensor data comprising respective sensor data acquired by respective vehicles of the plurality of vehicles, wherein the respective sensor data is indicative of: (i) sensor measurement data acquired by a perception sensor of the respective vehicles, (ii) a time the sensor measurement data was acquired, and (iii) a pose of the respective vehicles at the time the sensor measurement data was acquired, and wherein the sensor data comprises respective metadata indicative of: (i) sensor position of the perception sensor on the respective vehicles, (ii) vehicle type of the respective vehicles, and (iii) sensor modality of the perception sensor;

based on the sensor data, determining a plurality of solar irradiance levels for a plurality of locations within a geographic area, wherein determining the plurality of solar irradiance levels comprises:

processing the sensor data to determine one or more sunlit regions and associated infrared measurements depicted in the sensor data; and analyzing the one or more sunlit regions to determine whether the infrared measurements are consistent with sunlight;

generating a map layer based on the plurality of solar irradiance levels, the map layer being indicative of a respective solar irradiance level of respective sunlit regions of the one or more sunlit regions within the geographic area; and outputting the map layer to the plurality of vehicles or other vehicles that are in addition to the plurality of vehicles, wherein the plurality of vehicles or the other vehicles update map data by integrating the map layer to facilitate an estimation of solar charging potential for the plurality of locations within the geographic area, and wherein at least one vehicle of the plurality of vehicles or the other vehicles displays, on a user interface display, the updated map data indicating the estimated solar charging potential for the plurality of locations within the geographic area.

* * * * *